US010814282B2

(12) United States Patent
Vänttinen et al.

(10) Patent No.: US 10,814,282 B2
(45) Date of Patent: Oct. 27, 2020

(54) FILTER ELEMENT FOR A FILTER APPARATUS

(71) Applicant: OUTOTEC (FINLAND) OY, Espoo (FI)

(72) Inventors: Kari Vänttinen, Espoo (FI); Ismo Juvonen, Rauha (FI); Rolf Hindström, Turku (FI); Bjarne Ekberg, Turku (FI); Mika Illi, Vantaa (FI); Edward Vroman, Rauma (FI); Laura Simola, Turku (FI); Olli Högnabba, Kantvik (FI)

(73) Assignee: OUTOTEC (FINLAND) OY, Espoo (FI)

( * ) Notice: Subject to any disclaimer, the term of this patent is extended or adjusted under 35 U.S.C. 154(b) by 0 days.

(21) Appl. No.: 15/770,970

(22) PCT Filed: Nov. 3, 2015

(86) PCT No.: PCT/FI2015/050754
§ 371 (c)(1),
(2) Date: Apr. 25, 2018

(87) PCT Pub. No.: WO2017/077170
PCT Pub. Date: May 11, 2017

(65) Prior Publication Data
US 2018/0326357 A1 Nov. 15, 2018

(51) Int. Cl.
*B01D 63/16* (2006.01)
*B01D 33/23* (2006.01)
(Continued)

(52) U.S. Cl.
CPC .............. *B01D 63/16* (2013.01); *B01D 29/05* (2013.01); *B01D 29/111* (2013.01); *B01D 29/15* (2013.01);
(Continued)

(58) Field of Classification Search
CPC .............. A61L 24/106; A61B 17/00491; B01J 2219/00536; B01J 2219/00416;
(Continued)

(56) References Cited

U.S. PATENT DOCUMENTS 4,863,656 A * 9/1989 Hindstrom ......... B01D 39/2075
264/602
4,981,589 A 1/1991 Hindstrom et al.
(Continued)

FOREIGN PATENT DOCUMENTS

CL 2013000598 A1 8/2014
CL 2015001927 A1 11/2015
(Continued)

OTHER PUBLICATIONS

Written Opinion of the International Searching Authority issued by the European Patent Office acting as the International Searching Authority in relation to International Application No. PCT/FI2015/050754 dated Sep. 7, 2016 (8 pages).
(Continued)

*Primary Examiner* — Ana M Fortuna
(74) *Attorney, Agent, or Firm* — Robert P. Michal, Esq. .; Carter, DeLuca & Farrell LLP

(57) ABSTRACT

A filter element for a filter apparatus includes at least one filter member and a frame member arranged to support the at least one filter member in such a manner that an internal cavity is formed. The filter member includes a permeable membrane layer which has a first filter surface for receiving a pressure and directed towards an internal cavity arranged in-side the filter element, and a second filter surface for receiving solid particles filtered from a feed. The filter member forms a capillary filter.

18 Claims, 13 Drawing Sheets

(51) Int. Cl.
*B01D 29/15* (2006.01)
*B01D 29/11* (2006.01)
*B01D 29/05* (2006.01)
*B01D 69/02* (2006.01)
*B01D 71/02* (2006.01)

(52) U.S. Cl.
CPC ............ *B01D 33/23* (2013.01); *B01D 69/02* (2013.01); *B01D 71/02* (2013.01); *B01D 2313/025* (2013.01)

(58) Field of Classification Search
CPC  B01J 2219/0886; C02F 1/444; B01D 21/262; B01D 61/18; B01L 3/5085
See application file for complete search history.

(56) References Cited

U.S. PATENT DOCUMENTS

| | | | | |
|---|---|---|---|---|
| 5,178,777 | A * | 1/1993 | Ekberg | B01D 33/21 210/798 |
| 5,647,987 | A * | 7/1997 | Muller | B01D 15/361 210/198.2 |
| 5,730,869 | A * | 3/1998 | Koppe | B01D 29/111 210/345 |
| 8,647,507 | B2 * | 2/2014 | Uejima | B01D 61/20 210/321.6 |
| 2002/0195388 | A1 * | 12/2002 | Sierens | B01D 29/111 210/486 |
| 2002/1195388 | | 12/2002 | Sierens et al. | |
| 2005/0218057 | A1 * | 10/2005 | Ngee | B01D 25/164 210/224 |
| 2008/0073264 | A1 | 3/2008 | Kuo | |
| 2008/0284805 | A1 * | 11/2008 | Kiuchi | B41J 11/42 347/9 |
| 2010/0300955 | A1 | 12/2010 | Uejima et al. | |
| 2012/0055858 | A1 * | 3/2012 | Collins | B01D 29/39 210/121 |
| 2013/0270180 | A1 * | 10/2013 | Zhang | B01D 67/0046 210/500.25 |
| 2016/0074784 | A1 * | 3/2016 | Illi | B01D 33/21 210/739 |
| 2016/0121245 | A1 * | 5/2016 | Ekberg | B01D 33/23 210/222 |
| 2018/0154291 | A1 * | 6/2018 | Malo | B01D 33/23 |
| 2018/0361280 | A1 * | 12/2018 | Vanttinen | B01D 33/056 |

FOREIGN PATENT DOCUMENTS

| | | |
|---|---|---|
| CL | 2018001120 A1 | 6/2018 |
| CL | 2018001123 A1 | 6/2018 |
| CL | 2018001125 A1 | 6/2018 |
| CL | 2018001137 A1 | 6/2018 |
| CL | 2018001150 A1 | 7/2018 |
| CN | 1681574 A | 10/2005 |
| WO | 2001019503 A1 | 3/2001 |
| WO | WO-01/19503 A1 | 3/2001 |
| WO | 2004024291 A1 | 3/2004 |
| WO | WO-2004/024291 A1 | 3/2004 |
| WO | 2007088518 A1 | 8/2007 |
| WO | WO-2007/088518 A1 | 8/2007 |

OTHER PUBLICATIONS

International Search Report issued by the European Patent Office acting as the International Searching Authority in relation to International Application No. PCT/FI2015/050754 dated Sep. 7, 2016 (6 pages).

International Preliminary Report on Patentability issued by the European Patent Office acting as the International Preliminary Examining Authority in relation to International Application No. PCT/FI2015/050754 dated Feb. 9, 2018 (8 pages).

Chilean Office Action issued by the Chilean Patent Office in relation to Chilean Application No. 201801136 dated Jun. 11, 2019 (12 pages).

Chinese Office Action issued by the China National Intellectual Property Administration in relation to Chinese Application No. 201580084664.3 dated Nov. 4, 2019 (7 pages) along with English language translation (10 pages).

\* cited by examiner

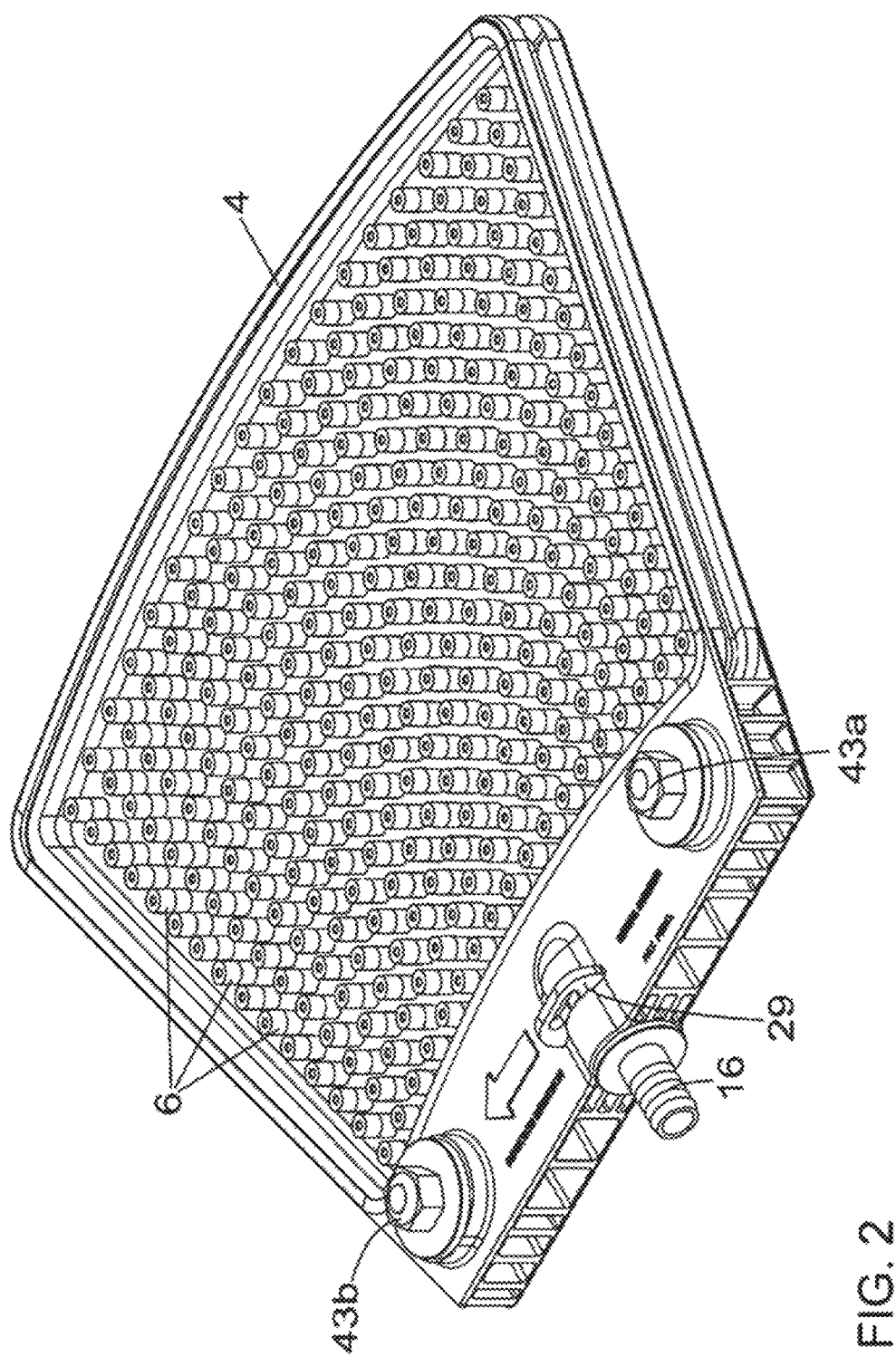

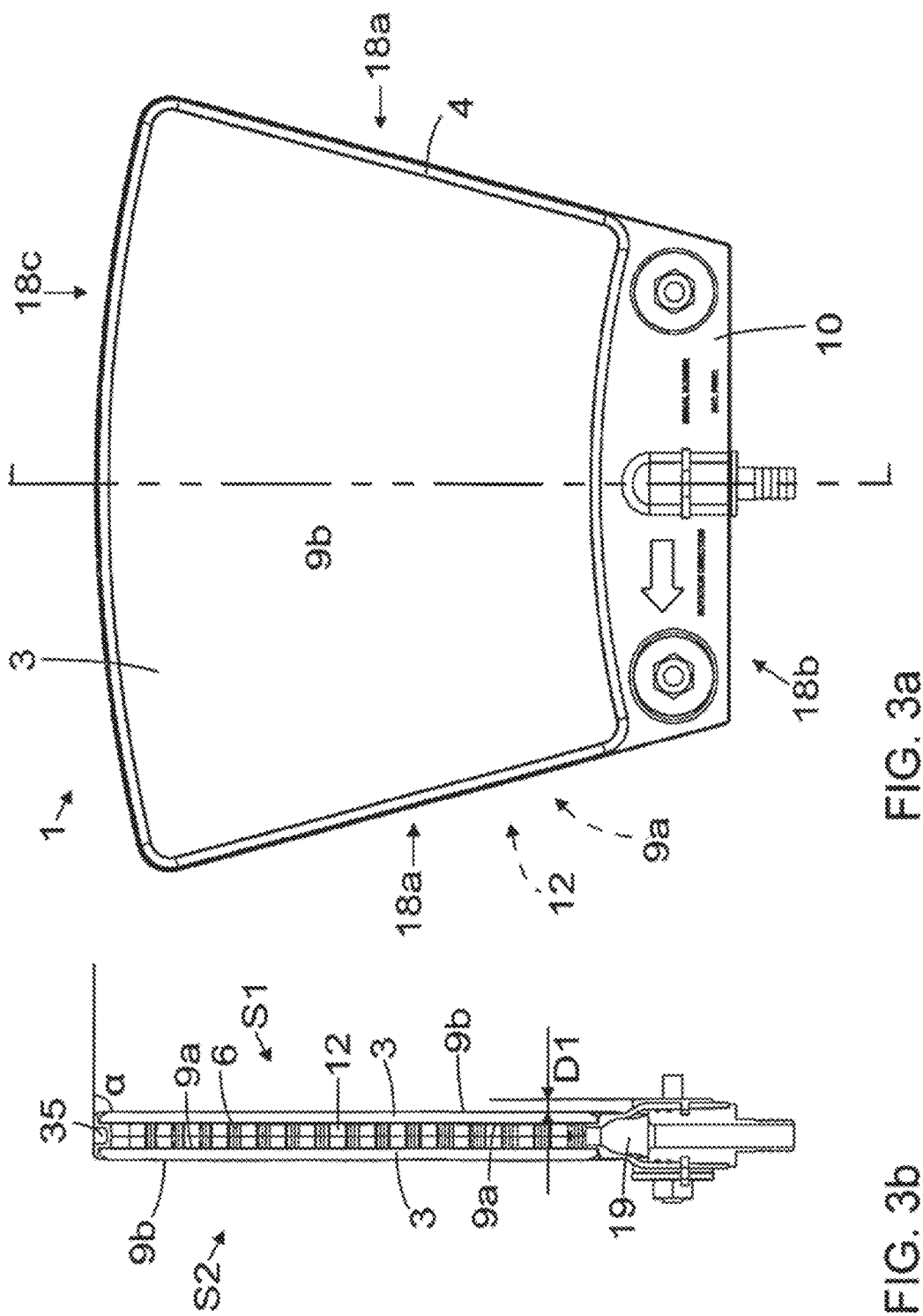

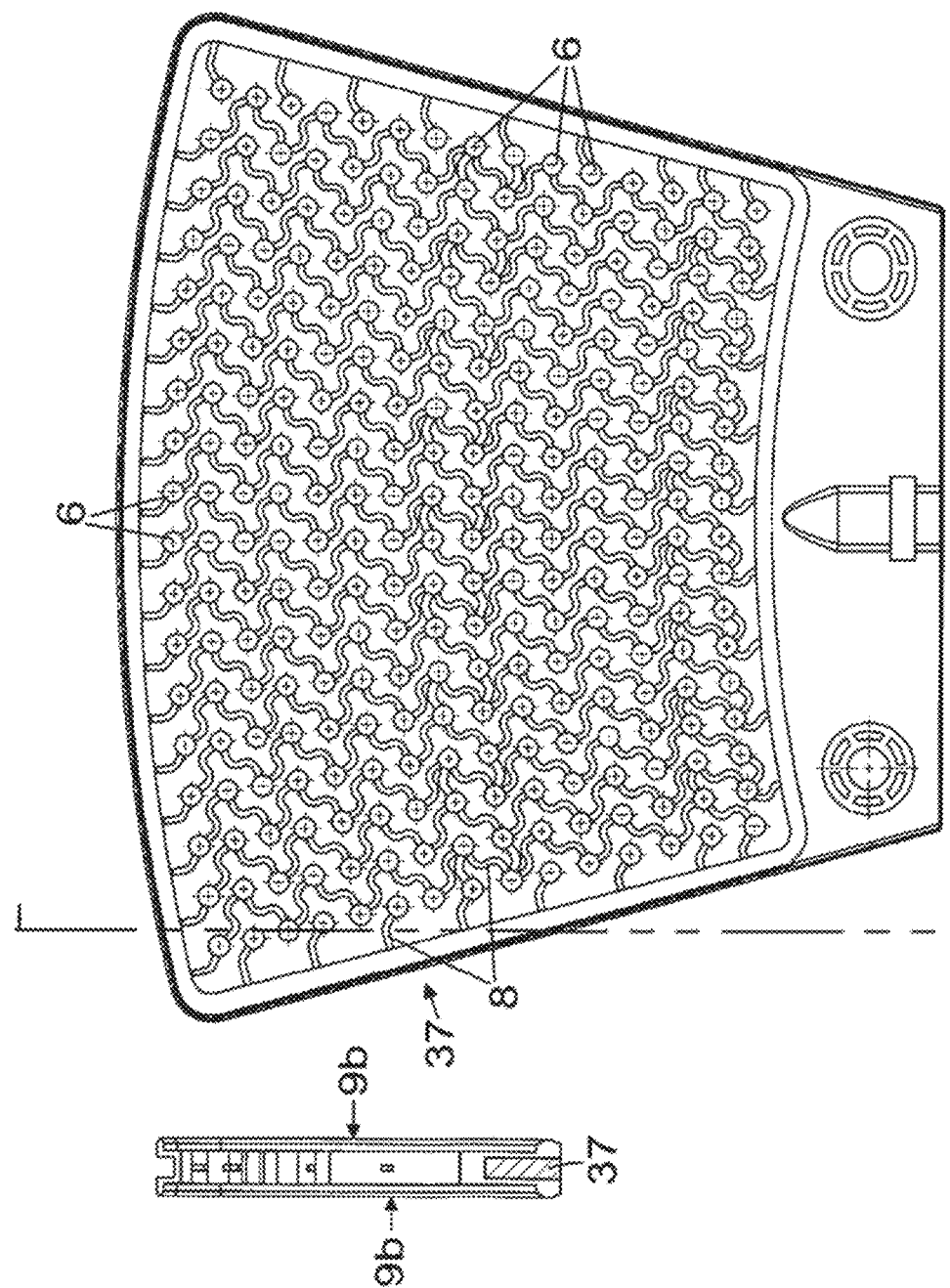

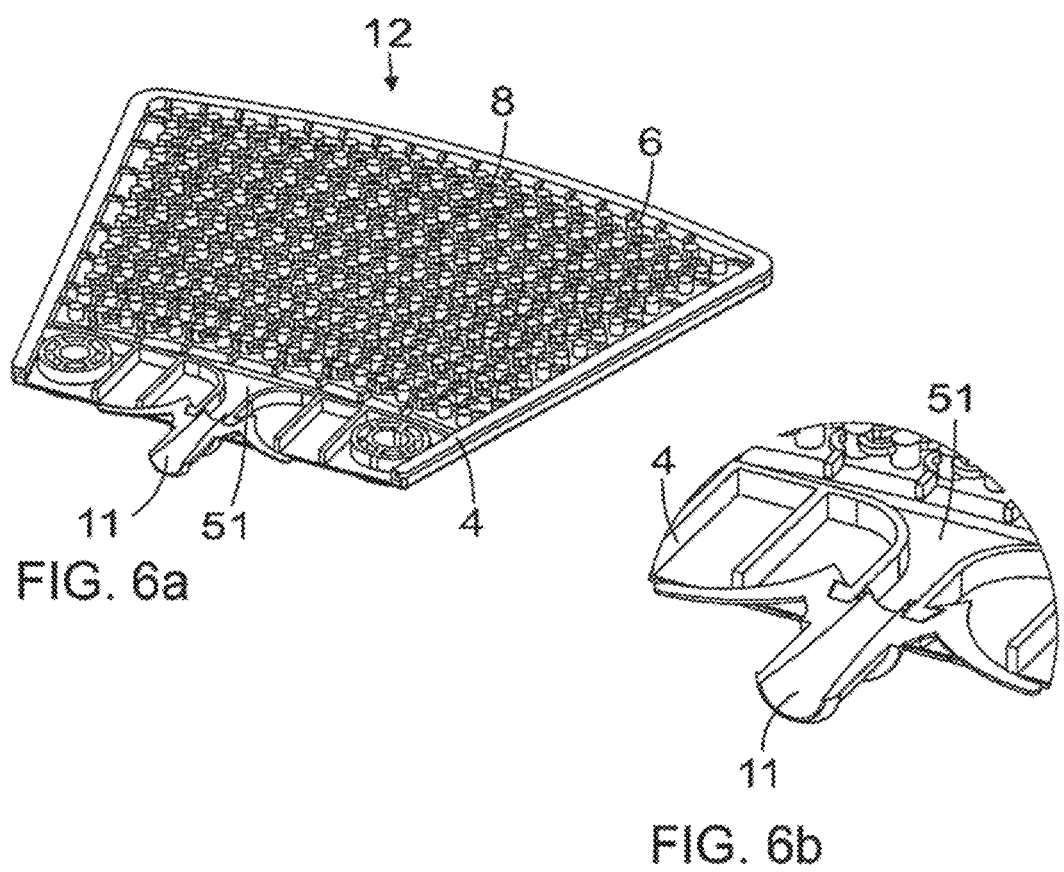

US 10,814,282 B2

FILTER ELEMENT FOR A FILTER APPARATUS

CROSS-REFERENCE TO RELATED APPLICATIONS

This application is a National Phase Entry under 35 U.S.C. § 371 of PCT International Application No. PCT/FI2015/050754 filed Nov. 3, 2015, the disclosure of which is expressly incorporated herein by reference in its entirety.

FIELD OF THE INVENTION

The invention relates to filtration, and more particularly to a filter element for a niter apparatus.

One of the disadvantages associated with known filter elements is that they are often heavy especially as they have absorbed liquid during use. This may make the filter elements hard to handle during maintenance, for example, and may endanger occupational safety.

BACKGROUND OF THE INVENTION

Filtration is a widely used process whereby a slurry or solid liquid mixture is forced through a media, with the solids retained on the media, as a cake, and the liquid phase passing through. This process is generally well understood in the industry. Examples of filtration types include depth filtration, pressure and vacuum filtration, and gravity and centrifugal nitration.

The most commonly used filter media for vacuum filters are filter cloths and coated media, e.g. the ceramic filter medium.

The use of a cloth filter medium requires heavy duty vacuum pumps, due to vacuum losses through the cloth during cake deliquoring. The ceramic filter medium, when wetted, does not allow air to pass through due to a capillary action. This decreases the necessary vacuum level, enables the use of smaller vacuum pumps and, consequently, yields significant energy savings.

BRIEF DESCRIPTION OF THE INVENTION

Viewed from an aspect, there can be provided a filter element for a filter apparatus, the filter element comprising at least one filter member comprising a permeable membrane layer and having a first filter surface for receiving a pressure and directed towards an internal cavity arranged inside the filter element, and a second filter surface for receiving solid particles filtered from a feed, wherein the filler member forms a capillary filter, and a frame member arranged to support the at least one filter member in such a manner that the internal cavity is formed.

Thereby it is possible to select materials for each part of the filter element based on part-specific requirements and a filter element that is light and durable when vacuum is Inside filter element may be achieved.

Viewed from another aspect, there can be provided a method for assembling a filter element for a filter apparatus, the method comprising the following steps:

providing at least one filter member comprising permeable membrane layer and having a first filter surface for receiving a pressure directed towards an internal cavity arranged inside the filler element and a second filter surface for receiving solid particles filtered from a feed, providing a frame member comprising an edge part comprising a peripheral edge surface, and mounting the filter member to the frame member in such a manner that the peripheral edge surface is arranged at an angle ( ) in relation to the first filter surface.

Thereby a method for manufacturing filter element that is light and durable when vacuum is inside filter element may be achieved.

Some other embodiments are characterised by what is stated in the other claims. Inventive embodiments are also disclosed in the specification and drawings of this patent application. The inventive content of the patent application may also be defined in other ways than defined in the following claims. The inventive content may also be formed of several separate inventions, especially if the invention is examined in the light of expressed or implicit subtasks or in view of obtained benefits or benefit groups. Some of the definitions contained in the following claims may then be unnecessary in view of the separate inventive ideas. Features of the different embodiments of the invention may, within the scope of the basic inventive idea, be applied to other embodiments.

BRIEF DESCRIPTION OF THE DRAWINGS

In the following the invention will be described in greater detail by means of preferred embodiments with reference to the attached [accompanying] drawings, in which

FIG. 2 illustrates a frame member of another filter element for a filter apparatus in perspective view;

FIG. 3a is a side view of a disc filter element;

FIG. 3b is a cutaway view of the disc filter element shown in FIG. 3a;

FIG. 4a is a schematic side view of another disc filter element;

FIG. 4b is a cutaway view of the disc filter element shown in FIG. 4a;

FIG. 6a is a schematic perspective top side view of a disc filter element;

FIG. 6b is a cutaway view of a detail of the filter arrangement shown in FIG. 6a;

DETAILED DESCRIPTION OF THE INVENTION

Principles of the embodiments can be applied for drying or dewatering fluid materials in any industrial processes, particularly in mineral and mining industries. In embodiments described herein, a material to be filtered is referred to as slurry, but embodiments are not intended to be restricted to this type of fluid material. The slurry may have high solids concentration, e.g. base metal concentrates, iron ore, chromite, ferrochrome, copper, gold, cobalt, nickel, zinc, lead and pyrite.

Figure 1:
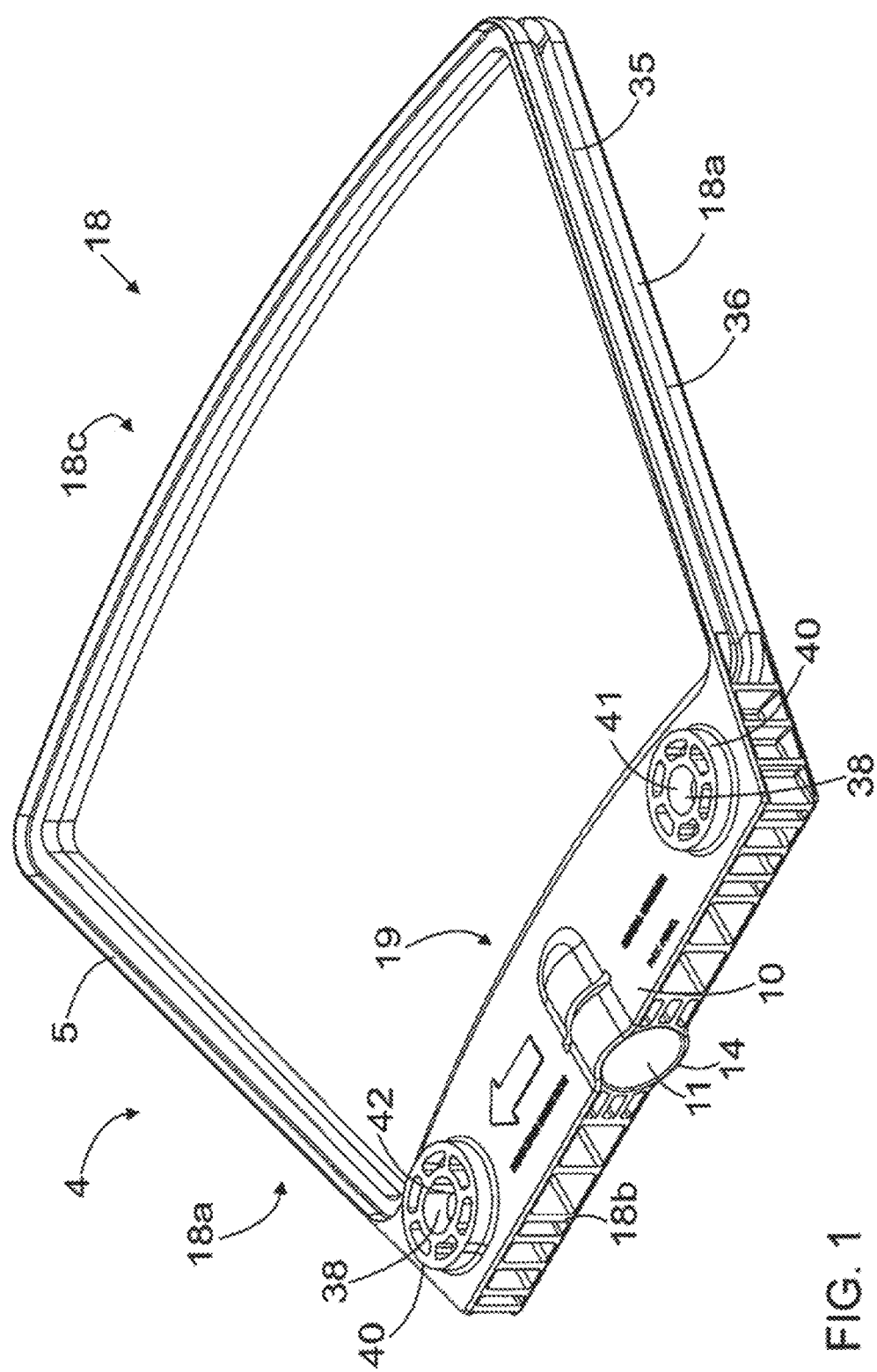
FIG. 1 illustrates a frame member of a filter element for a filter apparatus in perspective view.

FIG. 1 illustrates a frame member 4 of a filter element 1 for a filter apparatus 2 and FIG. 2 illustrates a frame member 4 of another filter element 1 for a filler apparatus 2. FIG. 3a is a side view of a disc filter element 1 and FIG. 3b is a cutaway view of the disc filter element shown in FIG. 3a. FIG. 4a is a schematic side view of another disc filter element, and FIG. 4b is a cutaway view of the disc filter element shown in FIG. 4a.

The filter element 1 may comprise at least one filter member 3. The filter member 3 may comprise a permeable membrane layer and have a first filler surface 9a for receiving a pressure. The pressure may comprise an underpressure (negative pressure) during filtering of a feed, whereby the underpressure provides suction on the first filter surface 9a. On the other hand, the pressure may comprise a positive pressure during cleaning and/or maintenance of the filter element 1, such as backwashing. The first filter surface 9a may be directed towards an internal cavity 12 arranged inside the filter element 1. According to an embodiment, the internal cavity 12 may be used to collect liquid filtered by the filter element 1 and guide the liquid to further processing. The underpressure during filtering may, thus, be provided inside the internal cavity 12.

The filter member 3 may further comprise a second filter surface 9b for receiving solid particles filtered from a feed.

The filter member 3 may form a capillary filter. A capillary filter refers to a filter, wherein the structure and/or the material of the filter, such as the filter member 3, enables a certain amount of liquid, such as water, to be kept in the filter by a capillary action. The liquid may be kept in micro-pores provided in the filter member 3, for example. Such a capillary filter enables the liquid to be filtered to easily flow through the filter member 3, but when all free liquid has passed through the filter member 3, the remaining liquid kept in the filter by the capillary action prevents flow of gas, such as air, through the wet filter member 3. The capillary action thus does not participate in the dewatering itself, for instance by sucking water out of the slurry. In other words, in a capillary filter liquid, usually water, may be kept in the micro-pores of the filter member 3 by capillary forces and no flow of gas takes place after the free water in the residue, such as the cake, has been removed. According to an embodiment, the filter member 3 formed as a capillary filter prevents air from entering the internal cavity 12.

According to an embodiment, the bubble point of the filter member 3 is at least 0.2 bar. In this context, the bubble point refers to an effective bubble point the effective bubble point describes a pressure difference between the first filler surface 9a and the second filter surface 9b, at which 1 liter of air flows through one square meter of the second filter surface 9b during a one minute time. In other words, when a 0.2 bar pressure difference is provided, in such a filter member 3, between the outside of the filter element 1 and the inside of the filler element 1, such as within the internal cavity 12, a maximum of 1 liter of air should be able to pass through a square meter of the second filter surface of the filter member 3 during a one minute time. If a flow of air through the filter member 3 at 1 liter per minute requires a pressure difference of 0.2 bar or greater, the bubble point of the filter member 3 is thus at least 0.2 bar. Thereby, in embodiments where it is not practical to block the flow of air completely, only a very minor amount of air may be able to flow through the filter member 3 when the cake is being dried. When the cake is being dried, an underpressure is provided within the filter element 1, such as within the internal cavity 12, which means than the pressure inside the filter element 1 is lower that the pressure outside the filter element 1.

According to an embodiment, at least 600 liter of water per an hour and per one square meter of the second filter surface 9b may be able to pass through the filter member 3 when a pressure difference of 1 bar is provided between the first filter surface 9a and the second filter surface 9b. Thus, a sufficient amount of water may flow through the filter member 3 to provide efficient filtering of the slurry, especially when the actual filtering takes place. During filtering, an underpressure is provided within the filter element 1, such as within the internal cavity 12, which means that the pressure inside the filter element 1 is lower than the pressure outside the filter element 1.

The pressure difference between the inside of the filter element 1 and the outside of the filter element 1 may be greater during the actual filtering than during the drying of the cake. The drying of the cake may take place for instance in a disc filter apparatus 2 when the filter element 1 in question has passed the filtering position, such as the lowest position in the filter 15 and rotated back upwards. In other words, a specific filter element 1 participates in the actual filtering at a different point of time and at a different position in the filter apparatus 2 than in the drying of the cake. Thus, the relevant pressure difference for the actual filtering and the drying of the cake may be different from one another.

The structure of the filter member 3, such as the mean pore size of the filter member 3, affects both the effective bubble point and the flow of water through the filter member 3.

The filter element 1 may further comprise a frame member 4 arranged to support the at least one filter member 3 in such a manner that the internal cavity 12 is formed. The frame member 4 may also be arranged to connect the filter member 3 to the filter apparatus 2.

In embodiments, where the filter member 3 and frame member 4 are provided as separate structural parts, materials of the filter member 3 and the frame member 4 can be selected independently. Thereby, the suitability of the materials for each part of the filter element can be evaluated separately and materials and their properties, such as lightness and degree or permeability, can be selected based on the specific requirements of each part. For instance, a filter element 1 can be provided that is light and at the same time durable to withstand changes in pressure related to vacuum being provided inside the filter element 1 during filtering and positive pressure being provided inside the filter element 1 during cleaning and/or maintenance.

According to an embodiment, the filter member 3 may comprise a material comprising micro-pores and the frame member 4 may comprise a material that does not comprise micro-pores. The frame member 4 may, thus, comprise a non-porous material. According to such an embodiment filter elements 1 of more uniform quality may be provided, as this enables more atomized work phases to be used instead. For instance manual coating, like painting for example, for closing the micro-pores in the parts of the frame member where the micro-pores are not beneficial or are not desirable can be avoided. According to an embodiment, the frame member 4 may comprise a material that does not let the liquid to be filtered through.

According to an embodiment, the frame member 4 may comprise at least one support part 8 for supporting the filter member 3. This enables providing a more durable structure of the filter element. According to a further embodiment, the frame member 4 may comprise a plurality of support parts 6. In such a filter element 1, the durability can be further improved and/or the flow of the filtered liquid inside the cavity 12 can be optimized.

According to an embodiment, the frame member 4 may comprise a plurality of support parts 6 spaced from other support parts 6, such that the support parts 6 do not transfer forces to one another. In embodiments, where the frame member 4 and filter member 3 arranged in contact with one another comprise materials with different thermal expansion coefficients, forces, such as torsional forces, may occur. These forces may be accumulated if continuous contact surfaces with large cross-section are formed, such as when a single support part 6 with a large cross-section in contact with the filter member 3 is provided. These forces may, for instance, compromise the durability of the filter element 1 and if the support parts 6 are arranged to one another in such a manner that these forces may be transferred between them, failure in one of the support parts 6 may accumulate while transferring to other support parts 6. A plurality of support parts 6 spaced from one another can be provided instead to avoid the transfer of forces between the support parts 6. Thus, problems related to thermal expansion can be avoided and the material(s) of the filter member 3 and the frame member 3, such as the material(s) of the support parts 6, can be selected more freely. In some embodiments, in other hand, the material(s) of the filter member 3 and frame member 4 may be selected to avoid or minimize problems related to thermal expansion instead of or in addition to structural means.

According to another embodiment, the frame member 4 may comprise one support part 6 to support the filter member 3. According to one embodiment, such a support part may 6 extend on the outer part of the filter member 3 and support the filter member 3 on the edges of the filter member 3. According to another embodiment, such a support part 6 may be positioned on the middle area of the filter member 3 supporting the filter member 3 substantially at the middle of the filter member 3.

According to an embodiment, at least one support part 6 may comprise a material that is less water-absorbent than the material of the filter member 3. This prevents the liquid from being absorbed in the frame member 4 during use. According to an embodiment, all support parts 6 positioned on the middle area of the filter member 3 supporting the filter member 3 substantially at the middle of the filter member 3 may comprise a material that is less water-absorbent than the material of the filter members. According to a further embodiment, all support parts 6 of the filter member 3 may comprise a material that is less water-absorbent than the material of the filter member 3.

According to an embodiment, the frame member 4 may comprise at least one support part 6 and the sum of the cross-sectional areas of a filter member end 44 of the support parts 6 may be in the range of 6 percent to 60 percent, preferably in the range of 10 percent to 40 percent, and more preferably in the range of 15 percent to 25 percent, of the sum of the areas of the first filter surfaces 9a of the filter members 3 arranged on the same side of the internal cavity 12 and at the filter member end 44 of the support parts 6.

The filter member end 44 of the support part(s) refers to the end of each support part 6 directed towards the filter member 3 in an assembled filter element 1. The cross-sectional area of a filter member end 44 of each support part 6 refers to the cross-sectional area of the support part 6 that is in contact with the filter member 3 and supporting the filter member 3. In embodiments, where there is only one support part 6, the cross-sectional area of the filler member end 44 of the support part equals the sum of the cross-sectional areas of a filter member end 44 of the support parts 6. In embodiments, where there are two or more support parts 6, the sum of the cross-sectional areas of a filter member end 44 of the support parts 6 refers to the combined cross-sectional area of these cross-sectional areas of the filter member end 44 of the support parts 6.

The sum of the areas of the first filter surfaces 9a of the filter members 3 arranged on the same side of the internal cavity 12 and at the filter member end 44 of the support parts 6 refers to one or more filter members 3 forming a filter surface on one side of the internal cavity 12 and the combined area of the first filter surfaces 9a these filter members 3. Thus, the areas of the support part(s) 6 and filter member(s) 3 facing one another and at least partly in contact with one another in an assembled filter element 1 are defined and compared. Depending on the embodiment and the type of the filter apparatus 2 the filter element 1 is designed for, the filter element 1 may comprise filter member(s) 3 on one or two opposite sides of the internal cavity 12, for example. If the filter element 1 comprises filter member(s) 3 on more than one side of the internal cavity 12, comparing may also be done for more than one side, for instance separately for each side.

By comparing the sum of the cross-sectional areas of a filter member end 44 of the support part(s) 6 to the sum of the areas of the first filter surfaces 9a of the filter members 3 arranged on the same side of the internal cavity 12 and at the filter member end 44 of the support parts 6, the percentage of combined area of the first filter surfaces 9a of the filter member(s) 3 being in contact with the support part(s) can be defined. When this percentage is in the range of 6 percent to 60 percent, preferably in the range of 10 percent to 40 percent, and more preferably in the range of 15 percent to 25 percent, as described above, an optimal combination of filter element properties can be achieved. For instance, a filter element 1 can be provided that endures a 0.3 bar pressure, preferably a 0.5 bar pressure, inside the internal cavity 12 during cleaning/maintenance and/or where both the flow of the liquid and sufficient support is optimized. According to other embodiments, a filter element 1 can be provided that endures a 2 bar or 5 bar pressure inside the internal cavity 12 during cleaning/maintenance. In other words the filter element 1 may endure a pressure inside the internal cavity 12 of the filter element 1 that is 0.3 bar, 0.5 bar, 2 bar or 5 bar higher than the pressure on the outside the filter element 1. The pressure outside the filter element 1 may typically be equal to the atmospheric pressure, in other words to a pressure of about 1 atm or 1 bar, but in some embodiments external pressure, which may be positive pressure or in some embodiments even underpressure, may be provided also outside the filter element 1. The filter element 1 should also endure rapid changes in the pressure, as the pressure affecting in the internal cavity 12 may change quickly for instance from underpressure, such as a 0.9 bar underpressure, to a positive pressure, such as a pressure of 1.5 to 3.0 bar, for example.

According to an embodiment, the structure of the frame member 4 may be formed to prevent transfer of forces, such as torsional forces, between the support parts 6. Thus, problems caused by thermal expansion can be avoided or decreased by structural means instead of or in addition to by the properties of the materials the filter element 1 comprises. This provides an improved and long-fasting solution for avoiding the effect of forces, for example torsional forces, that might compromise the durability of the filter element 1. In addition to thermal expansion, these forces may comprise mechanical forces caused by loads, changes in the negative and/or positive pressures inside and outside the filler element 1 or some other features related to the use of the filter element 1, for example.

According to an embodiment, each support pad 6 may be connected to at least one other support part 6 by a connector 8 comprising a nonlinear shape, such as a curved shape. Such a structure comprising support parts connected to one other is easy to handle during assembly, for example, while the non-linear shape of the connectors 8 effectively decreases the transfer of forces between the support parts 6.

According to an embodiment, at least one of the support parts 6 may be connected to at least one of the other support parts 6 by a connector 8 that does not transfer forces or at least decreases the transfer of forces between the support parts 6. Such a connector 8 may comprise a connector 8 that is formed as flexible in at least one direction. The flexibility may be provided by selection of the material of the connector 8 and/or by making the connector 8 so thin that it cannot transfer considerable forces between the support parts 6.

According to an embodiment the support parts 6 are not connected to one another, but are only in contact with the filter members 3. Such support parts 6 can be formed to be easy to manufacture, for instance by a robot, and modular, such that similar support parts 6 can be used in different kind of filter element configurations. This can save in number and cost of molds, for example. Still, a filter element 1 that is light and durable to stand both positive and underpressures inside the internal cavity 12 during use and maintenance and/or that works well in different temperatures during manufacturing and use can be provided.

According to an embodiment, the number of support parts 6 on a square meter of first filter surface 9a may be in the range of 50 to 4000 support parts 6. A most suitable number of support parts 6 depend on the embodiment, such as the type of the filter apparatus and the purpose it is used for, and the cross-sectional area of each individual support part 6. For instance, according an embodiment where the support parts 6 comprise a round cross-section, a number of support parts 6 on a square meter of first filter surface 9a may be in the range of 1000 to 4000 support parts 6, preferably in the range of 1500 to 2500 support parts 6. According to an embodiment where the support parts 6 comprise an elongated cross-section, a number of support parts 6 on a square meter of first filter surface 9a may be in the range of 50 to 400 support parts 6, preferably in the range of 100 to 200 support parts 6.

According to an embodiment, the cross-sectional area of each support part 6 is in the range of 0.5 to 3000 square centimeters.

By selection of a suitable number and/or cross-sectional area of the support parts 6 optimal flow of the filtered liquid and sufficient support for the filter member(s) 4 to withstand the pressures during use and maintenance can be enabled.

According to an embodiment, at least one support part 6 may comprise an aperture extending through the support part 6 between the filter member end 44 of the support part 6 and the end of the support part 6 opposite to the filter member end 44 in a direction substantially parallel to the direction of the first filter surface 9a. In other words, the aperture may extend in a transverse direction between the ends of the support part, in embodiments, where the filter element 1 may be used in a disc filter apparatus, the support part may have two filter member ends, one towards each one of the filter members arranged at opposite ends of the support part 6. In such embodiments, the end of the support part 6 opposite to the filter member end 44 may, naturally, also comprise a filter member end. Such aperture may enable better flow of the filtered liquid within the internal cavity 12.

According to an embodiment, the frame member 4 may comprise an edge part 5 comprising a peripheral edge surface 18 that is arranged at an angle α in relation to the first filter surface 9a. In FIG. 3b the angle α is 90 degrees or close to it, but in other embodiments the angle α might differ from a right angle. The edge part 5 refers to a part of an edge of the frame member 4 extending on one or more edges of the frame member 4. In some embodiments, this edge part 5 and the at least one filter member 3 may at least partly define the internal cavity 12. The edge part 5 may comprise a part extending on the connecting member end 10 of the filter element 1 and/or the distal end of the filter element 1 opposite to the connecting member end and/or one of the sides S1, S2 (shown in FIG. 3b) of the filter element 1 extending between the ends of the filter element 1. This enables supporting the filter member(s) 3 also on the edges of the filter element 1 for a better durability and/or forming the internal cavity 12 within the filter element 1. Additionally, such an edge part 5 may also be formed of a different type of a material, such as a non-porous material, to avoid leaking of liquids from the internal cavity 12 towards the edges of the filter element 1.

According to an embodiment, the frame member 4 may comprise a different material or combination of materials than the filter member(s) 3. According to an embodiment, the frame member 4 may have a thermal expansion coefficient different from that of the filter member 3.

According to an embodiment, the filter member 3 may comprise a ceramic material or a composition comprising a ceramic material. Using a ceramic material or a composition comprising a ceramic material in the filter member(s) 3, very good filtering properties may be achieved. These materials are also wear resistant and hydrophilic. According to an embodiment, the ceramic material may comprise alumina (Al2O3), aluminium silicates, silicon carbide and/or titania (TiO2).

According to an embodiment, the filter member 3 may comprise at least one of the following: a polymer material a composition comprising a polymer material and a metal.

According to an embodiment, the frame member 4 may comprise a polymer material or a composition comprising a polymer material. This enables making the frame member 4 and, thus, the filter element 1 light and durable, avoiding the frame absorbing water that would increase the weight of the frame member 4 and the filter element 1 in use and/or providing more flexibility in the frame member 4 and, therefore, the filter element 1. The polymer material may comprise a thermoplastic, for example. The thermoplastic may comprise at least one of the following: polyamide (PA), polysulphone (PSU), polyethersulphone (PES), polyphenylene oxide (PPO), polyphenylene sulphide (PPS), acrylo butadiene styrene (ABS), polybutylene terephthalatate (PBT), polycarbonate (PC), and polyolefins, such as polypropylene (PP), polyethylene (PP), e.g. high density polyethylene (HDPE). The thermoplastics may be particularly suitable for molding such frame member 4 structures. According to another embodiment, the polymer material may comprise a thermoset plastic, for instance an epoxy, a polyurethane or a polyester.

According to an embodiment, at least the surface of the support parts 6 comprises the polymer material. A polymer material may be used for instance to provide smooth surfaces minimizing the effect of the support parts 6 on the flow of the filtered liquid.

According to a further embodiment, the frame member may comprise metal.

According to an embodiment, the edge part 5 of the frame member 4 may comprises a material that differs from the material of the support parts 6. In other words, parts of the frame member 4 may comprise different materials or combinations of materials. This enables selection of a material most suitable for each structural part of the frame member 4 from part-specific requirement point of view.

According to another embodiment, the edge part 5 of the frame member 4 may comprise the same material as the material of the support parts 6. This ensures that the parts of the frame member 4 have the same thermal expansion coefficient, which helps avoiding forces being formed between the edge part 5 and the support parts 6.

According to an embodiment, the frame member 4 comprises a material, the water absorbance of which is less than 15 percent, preferably less than 5 percent, of the dry weight of the material. In other words, the frame member 4 may comprise a material capable of absorbing a maximum of 15 g of water per 100 g of dry weight of the material. Preferably, the frame member 4 may comprise a material capable of absorbing a maximum of 5 g of water per 100 g of dry weight of the material.

According to an embodiment, at least one filter member 3 may be arranged fixedly to the frame member 4. According to an embodiment, the at least one filter member 3 may be glued or melted fixedly to the frame member 4. These methods of fixedly arranging filter member 3 to the frame member 4 can provide a durable bond, be beneficial from manufacturing point of view and/or provide a filter element 1 that is light and durable when vacuum (=underpressure) or pressure (=positive pressure) is provided inside the internal cavity 12. According, to an embodiment, the at least one filter member 3 may be arranged fixedly to at least one support part 6 of the frame member 4. This may additionally help avoiding problems related to thermal expansion.

According to an embodiment, at least a part of at least one surface of the filter member may be formed as a rough joining interface 7 comprising a grit number lower than or equal to 180, preferably comprising a grit number in the range of 40-180, more preferably comprising a grit number in the range of 60 to 120. This enables a more durable bond between a ceramic material and the frame member material to be provided. According to an embodiment, at least a part of the surface of the filter member formed as a rough joining interface may be in contact with the frame member. This is beneficial, as a tough joining surface makes the ceramic material easier to join durably to the frame member material.

According to an embodiment, a part of a surface of the filter member 3 outside the rough joining interface 7 may nave a smooth surface that is smoother than the rough joining interlace 7, i.e. its grit number is larger than 180. According to an embodiment said smooth surface has a grit number of 800 or more. The smooth surface may cover at least a part of the first filter surface 9a and/or at least a part of the second filter surface 9b. Preferably, the second filter surface 9b as a whole is formed as a smooth surface. In other words, according to an embodiment at least a part of at least one surface 9a, 9b of the filter member 3 may comprise a grit number greater than or equal to 600. This kind of smooth surface may reduce contaminations of the surface as well as provide more effective removal of a residual cake in a backflush washing of the filter element 1.

According to an embodiment, the rough joining interface 7 may extend over the first fitter surface 9a as a whole.

According to an embodiment, the filter element may comprise at least one filter member 3 arranged on each side of the frame member 4 providing two first filter surfaces 9a, one on each side of the frame member 4. Such a filter element 1 may be suitable for a disc filter apparatus and the filtering surface may be doubled. A known type of a filter element may, thus, be provided that is easier to manufacture than the known configurations and enables automized manufacturing process and equipment with less or no need for manual work phases enabling more uniform quality.

According to an embodiment, each end of a support part 6 may be arranged fixedly to one of said filter members 3, such that the support part 6 is arranged fixedly between two filter members 3. This is particularly beneficial in connection for filter members 3 and filter elements 1 suitable for use in connection with a disc filter apparatus. Then, a more durable bond and filter element structure may be provided. Also the risk of the filter element 1 structure failing during back washing of the filter element, in other words cleaning with positive pressure provided on the first filter surface 9a, can be decreased.

According to an embodiment, the strength of the connection between a support part 6 and a filter member 3 is sufficient for the filter element 1 to endure pressure of at least 0.3 bar, preferably 0.5 bar, more preferably 2 bar and most preferably 5 bar, inside the internal cavity 12. In other words the filter element 1 may endure a pressure inside the internal cavity 12 of the filter element 1 that is 0.3 bar, 0.5 bar, 2 bar or 5 bar higher than the pressure on the outside the filter element 1. The pressure outside the filter element 1 may typically be equal to the atmospheric pressure, in other words to a pressure of about 1 atm or 1 bar, but in some embodiments external pressure, which may be positive pressure or in some embodiments even underpressure, may be provided also outside the filter element 1. Such a filter element 1 can withstand the pressures during use and maintenance, for example backwashing.

According to an embodiment, the filter element 1 may be a truncated-sector-shaped filter element 1 and comprising second filter surfaces 9b on both sides of the element 1. Such a filter element is suitable for a disc filter apparatus. Thus, a complicated structure may be manufactured in an easier manner and/or a more uniform quality may be achieved by automized manufacturing.

According to an embodiment, the filter element 1 may be a filter element 1 of a drum filter apparatus. Such a fitter element 1 may comprise a pair of side edge surfaces 18a arranged parallel with each other, and comprising second filter surface(s) 9b only on one side of the filter element 1. Such a filter element 1 may further comprise a pair of curved end surfaces 18d, wherein the curvature of the curved end surfaces 18d and the curvature of the second filter surface(s) 9b of said filter element 1 coincide with the circumference of the outer surface of a drum filter of the drum filter apparatus 2. Such a filter element 1 may help manufacturing a known, complicated filter element structure more easily, as the filter member can be manufactured separately and arranged to the "box".

According to an embodiment, the filter element (1) is a filter element (1) of a belt filter apparatus.

According to an embodiment, the total area of second filtering surface(s) 9b of one filter element 1 may be greater than or equal to 0.1 square meters. The total area of second filtering surface(s) 9b of one filter element 1 suitable for use in a disc filter apparatus may preferably be in the range of 0.1 square meters to 2 square meters, and more preferably in the range of 0.2 square meters to 1 square meters. The total area of second filtering surface(s) 9b of one filter element 1 suitable for use in a belt filter apparatus may preferably be in the range of 0.5 square meters to 5 square meters, and more preferably in the range of 1 square meter to 3 square meters. Thus, such a filter element 1 can be sufficient for production environment.

According to an embodiment, at the least one frame member 4 may comprise between a connecting member end 10 of the frame member 4 and the filter member 3 a material that is more flexible than the material of the filter member 3, wherein the connecting member end 10 of the frame member is the end at which the filter element 1 is arrangeable to the filter apparatus (2). In other words, the frame member may comprise such a flexible material in the vicinity of the connecting member end, that is at least a part of the frame member 4 extending between the connecting member end 10 and the filter member(s) 3 may comprise such flexible material. This helps enabling the filter element 1 to bend when arranged in contact with a scraper (not shown) of the filter apparatus to avoid damage caused by the scraper to the filter element. This is particularly beneficial in embodiments, where the filter member comprises a ceramic material, as ceramic material is typically rigid and the flexibility is particularly important in connection with filter member(s) 3 comprising such a rigid material. In this context, flexibility refers to a material's ability to receive external forces applied to it toy bending but not breaking. Thus, the more flexible material can receive larger external forces applied to it without breaking than the less flexible material.

According to an embodiment, the more flexible material may reversibly flexible. In this context, reversibly flexible material refers to a material that is capable of receiving external forces of the magnitude typical for filter apparatuses in such a manner, that the object formed of the reversibly flexible material may bend but does not deform permanently. Thus, when flexible material is reversible flexible, machine could be used even after hit as the hit would not deform the filter element 1 permanently. According to another embodiment, the more flexible material may be non-reversible flexible. This might be sufficient in some embodiments, as even if the more flexible material would be only non-reversibly flexible, it could still make it possible to avoid a domino effect in filter apparatus breaking also adjacent filter elements even if the certain plate would be damaged. Flexible material may comprise a polymeric material or a composition comprising a polymeric material.

According to an embodiment, the frame member 4 may comprise between the connecting member end 10 of the frame member 4 and the filter element(s) a plastic portion comprising a plastic material. According to an embodiment, the plastic portion may comprise identification information for filter element 1 identification purposes. Such a plastic portion may permanently provide good elastic properties and enable flexibility that decreases the probability of deformations related to hits and other external forces affecting the filter element 1.

According to an embodiment, the at least one frame member 4 may form at least the outer edge surface 18c of the filter element 1. The outer edge surface 18c of the filter element 1 may be located at the opposite end of the filter element 1 compared to the connecting member end 10 of the filter element 1 at which the filter element 1 is arrangeable to the filter apparatus 2. At least the outer edge surface 18c of the frame member 4 may comprise a non-porous and acid-resistant material. The frame member 4 may, thus, extend from the outer edge surface 18c towards the connecting member end 10.

According to an embodiment, the connecting member end may comprise at least two holes 41, 42 for arranging the filter element 1 to the filter apparatus 2. According to an embodiment, the openings extend through the material. If other words, the openings are not blind holes.

According to an embodiment, the connecting member end comprises the narrower end of the truncated-sector-shaped filter element 1.

According to an embodiment the non-porous and acid-resistant material of the frame member 4 is additionally tough, durable, resilient and/or shock absorbing.

According to an embodiment, the non-porous and acid-resistant material of the frame member 4 is additionally less water-absorbent than the material of the filter member 3. This helps avoiding acid leaking during maintenance and providing lighter elements and, thus, supports more safe maintenance of the filter apparatus.

According to an embodiment, the frame member 4 comprises a material, the water absorbance of which is less than 15 percent, preferably less than 5 percent, of the dry weight of the material. In other words, the frame member 4 may comprise a material capable of absorbing a maximum of 15 g of water per 100 g of dry weight of the material. Preferably, the frame member 4 may comprise a material capable of absorbing a maximum of 5 g of water per 100 g of dry weight of the material.

According to an embodiment, the at least one frame member 4 additionally covers the connecting member end 10 of the filter element 1.

According to an embodiment, the at least one frame member 4 may additionally at least partly cover both side edges 18a of the filter element 1, wherein the side edges are located at the each side of the filter element 1 arrangeable to face towards the adjacent filter element 1.

According to an embodiment, a filter apparatus 2 may comprise at least one filter element 1 described in this description, wherein the filter apparatus (2) comprises at least one of the following: a disc filter apparatus, a drum filter apparatus and a belt filter apparatus. In such a filter apparatus, support part(s) 6 support the filter member 3 especially during underpressure in the internal cavity 12. The frame member 4 and the filter member(s) being fixedly arranged to one another in some embodiments may further improve keeping the parts together during backwashing, for example.

Figure 13:
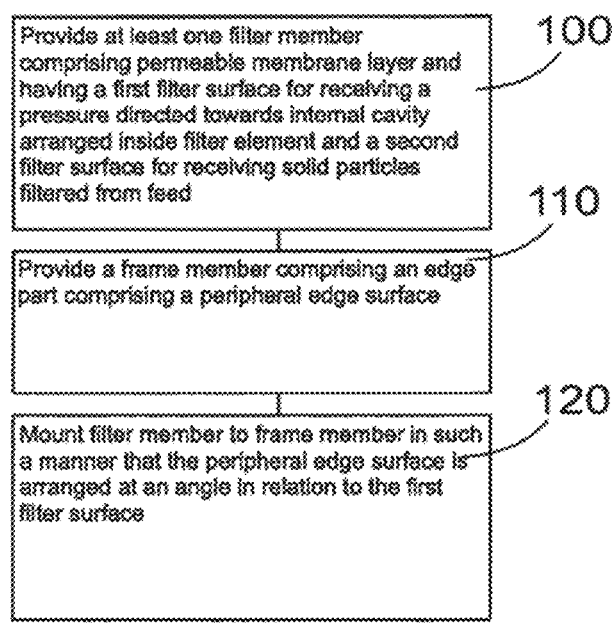
FIG. 13 illustrate a method for assembling a filter element for a filter apparatus.

FIG. 13 illustrates a method for assembling a filter element 1 for a filter apparatus 2. The method may comprise providing 100 at least one filter member 3 comprising permeable membrane layer and having a first filter surface 9a for receiving a pressure directed towards an internal cavity 12 arranged inside the filter element 1 and a second filter surface 9b for receiving solid particles filtered from a feed. The method may further comprise providing 110 a frame member 4 comprising an edge part 5 comprising a peripheral edge surface 18, and mounting 120 the filter member 3 to the frame member 4 in such a manner that the peripheral edge surface 18 is arranged at an angle ( ) in relation to the first filter surface 9a.

According to an embodiment, the frame member 4 may comprise support parts 6 that are arranged to support the filter member 3 when the niter member 3 is mounted to the frame member 4. According to an embodiment, the support parts 6 are spaced from one another, such that the support parts 6 do not transfer forces to one another. Thereby transferring forces, such as torsional forces caused for instance by thermal expansion, between the support parts 8 can be avoided. This decreases problems related to thermal expansion, for example.

According to an embodiment, the method further comprises forming at least a part of at least one surface of the filter member 3 as a rough joining interface 7. In such a method, the filter member 3 may be mounted to the frame member 4 in such a manner that at least a part of the surface of the filter member 3 formed as a rough joining interface 7 is in contact with the frame member 4. The rough Joining surface can make the ceramic material easier to join durably to the frame member material. According to an embodiment, the rough joining interface 7 may comprise a grit number in the range of 40-180, preferably in the range of 80 to 120. This can enable more durable bond between a ceramic material and the frame member material.

According to an embodiment, at least part of the peripheral edge surface 18 comprises at least one groove 35 or at least one ridge 36 arranged along the at least part of the peripheral edge surface 18. The filter element shown in FIG. 1 comprises two ridges 36 and one groove 35 there between. This kind of structure is very simple and rugged. An alternative structure being simple and rugged comprises one ridge 36 and a groove 35 either on one or both side(s) of the ridge 33.

The groove 35 and the ridges 36 are arranged on the side edge surfaces 18a and the outer edge surface 18c. On the side edge surfaces 18a the length of the groove 35 and the ridges 36 is essentially equal with the length of the filter member 3.

It is to be noted here, that the at least one groove 35 or at least one ridge 36 may have length that is at least essentially equal with the length of the corresponding edge surface 18a, 18b, 18c, or alternatively, the at least one groove 35 or at least one ridge 36 may be essentially shorter than the corresponding edge surface 18a, 18b, 18c. It is possible, of course, to arrange multiple of grooves 35 or ridges 36 on the peripheral edge surface.

In another embodiment, there is at least one groove 35 or at least one ridge 36 on side edge surface 18a, but not on the outer edge surface 18c.

In further embodiment, the filter element 1 comprises at least one groove 35 or at least one ridge 36 on only one of its two side edge surfaces 18a. It means that one of its two side edge surfaces 18a is without the groove 35 and the ridge 36.

In still another embodiment, the inner edge surface 18b also comprises at least one groove 35 or at least one ridge 36.

An advantage of the at least one groove 35 or at least one ridge 38 is that a seal member 37 may be attached to the peripheral edge surface 18, the seal member 37 filling a gap between two adjacent filter elements 1. Thus the gap may be avoided and the user safety of the apparatus increased. The gap in a rotating filter would be a potential safety risk because there is a possibility that an operator of the filter apparatus push something, e.g. finger, a tool etc., in the gap, resulting an accident the consequence of which is unforeseeable.

The seal member 37 may be manufactured e.g. from an elastic material or elastic material composition, such as natural or synthetic rubber and compositions thereof. The profile of the seal member 37 fits to the at least one groove 35 or at least one ridge 36 such that, preferably, no adhesives or any other attaching means are needed. However, it is also possible to use attaching means in order to attach the seal member 37 to the at least one groove 35 or at least one ridge 38.

According to an embodiment, the at least one groove 35 or at least one ridge 36 is applied to a filter element of a drum filter apparatus. The drum filter element comprises a pair of side edge surfaces arranged parallel with each other, and a second filter surface(s) only on one side of the filter element. Furthermore, the drum filter element comprises a pair of curved end surfaces, the curvature of which and the curvature of the second filter surface(s) of said filter element coincide with the circumference of the outer surface of a drum filter of the drum filter apparatus. The at least one groove 35 or at least one ridge 38 may be arranged on at least one of the side edge surfaces and/or the curved end surfaces.

According to another embodiment, the at least one groove 35 or at least one ridge 38 is applied to a filter element of a belt filter apparatus. The belt filter element comprises a pair of side edge surfaces arranged parallel with each other, and a pair of end surfaces. The at least one groove 35 or at least one ridge 36 may be arranged on at least one of the side edge surfaces and/or end surfaces.

The connecting member end 10 of a disc filter apparatus comprises a connecting member 22 in order to attach the filter element 1 to the filter apparatus 2.

In the embodiment shown in FIG. 1, the connecting member 22 comprises two fastening openings 38 for attaching the filter element 1 to mounting means in the frame of the filter apparatus. The fastening openings 38 are formed by the material of the connecting member end 10.

According to an embodiment, there is a fastening arrangement for fastening the filter element 1 to the filter apparatus. Said arrangement comprises mounting means 39 (shown in FIG. 5b) in the frame of the disc filter apparatus 2, and fastening elements 43a, 43b (shown in FIG. 2a) that are arrangeable in the fastening openings 38 in direct coupling with the material of the connecting member end 10.

Thus there are no glued or sealed components in the structure of the fastening openings 38 that could cause a risk for penetration of washing acid out from the filter element 1. This way the user safety of the apparatus is increased. Additionally, the dimensional accuracy of the fastening openings, especially in their longitudinal direction, may be improved, since gluing step tends to cause variations in dimensions in said direction.

According to an embodiment, the length of the fastening opening 33 is greater than the distance between the second filter (i.e. outer) surfaces 9b of the filter element 1. An advantage is that a firm and stabile support for the filter element may be created.

According to an embodiment, the fastening opening 38 is arranged in a hub 40 that is thicker than other parts, especially the connecting member end 10, of the filter element 1. An advantage is that the firm and stabile support for the filter element can be created without using an excessive amount of material in the connecting member end 10.

According to an embodiment, all the fastening openings 38 are equal in length. Thus the fastening means, e.g. bolts, can be standardized in one length.

According to an embodiment, the first end of each of the fastening openings 38 arranged on the first side S1 of the filter element 1 are arranged outer and at a first distance D1 from plane of the second filter surface 9b arranged on said first side 81 of the filter element 1, and said first distance D1 is equal in each of the fastening openings 38. The first distance D1 is selected so that the filter element 1 automatically sets in its correct position in the filter apparatus. An advantage is that the installation work of the filter element may be quickened. According to an embodiment, the first distance is in range of 1 mm-20 mm, preferably 4 mm-12 mm, more preferably 8 mm-10 mm.

According to an embodiment, the connecting member end 22 may comprise at least two fastening openings 38 for attaching the filter element 1 to mounting means 39 in a frame of the disc filter apparatus. According to an embodiment, the openings 38 extend through connecting member end 22. In other words, the openings are not blind holes.

According to an embodiment, the fastening openings 38 comprise a fitted hole 41 and an elongated hole 42.

The fitted hole 41 is dimensioned for an accurate tolerance with a first fastening element 43a attaching the fitted hole 41 to said mounting means 39.

The elongated hole 42 is dimensioned for an accurate tolerance in a first direction T1 but for a loose tolerance in a second direction T2 with a second fastening element 43b attaching the elongated hole 42 to said mounting means 39. The first direction T1 is orthogonal to the second direction T2 and, furthermore, the second direction T2 is directed towards the fitted hole 41.

The fitted hole 41 takes care of an accurate positioning of the filter element 1 to the apparatus.

Also the elongated hole 42 takes care of an accurate positioning in the first direction T1 but allows dimensional deviations in the second direction T2. Said dimensional deviations may be caused by e.g. inaccuracy at placement of the fastening elements 43a, 43b, manufacturing tolerances of the filter element 1, different heat expansions in the element 1 and the mounting means 39, etc.

Further advantages may include: decreasing the assembly time due to tolerance allowance, and decreasing the risk of damaging the filter element 1 during its assembly.

According to an embodiment, the fitted hole 41 may have a round shape. Such shape is simple to manufacture. According to another embodiment, the fitted hole 41 has a complex shape, e.g. the inner surface of the hole may comprise apexes being situated closer to the middle axis of the hole and depressions being situated farther from the middle axis of the hole, or the hole fitted hole may nave a shape of polygon. The complex shape may e.g. reduce friction between the fitted hole 41 and the first fastening element 43a during the assembly work.

According to an embodiment, the elongated hole 42 may have a shape of rectangular with rounded ends. The rounded ends reduce tensions in the material of the connecting member end 10. However and alternatively, the elongated hole 42 may have rectangular ends.

According to an embodiment, in the first direction T1 the elongated hole 42 has equal diameter with the smallest diameter of the fitted hole 41. Thus the first and the second fastening elements 43a, 43b can be identical in their dimensions and thus they can be used in any of the holes 41, 42.

According to an embodiment, the dimension of the elongated hole 42 in the second direction T2 is larger by 1.01 to 1.20 times the distance between the lifted hole 41 and the elongated hole 42, when compared to the dimension of said elongated hole 42 in the first direction T1. According to an embodiment, the distance between the holes 41 and 42 is 239 mm, and the dimension in the second direction 12 may be larger by 2.39 mm to 47.8 mm compared to the dimension in the first direction T1.

According to an embodiment, the dimension of the fitted hole 41 is 12 mm to 30 mm depending e.g. the size and mass to the filter element 1. According to an embodiment, the dimension of the fitted hole 41 is 20 mm whereas the elongated hole 42 is 20×25 mm.

Figure 5A:
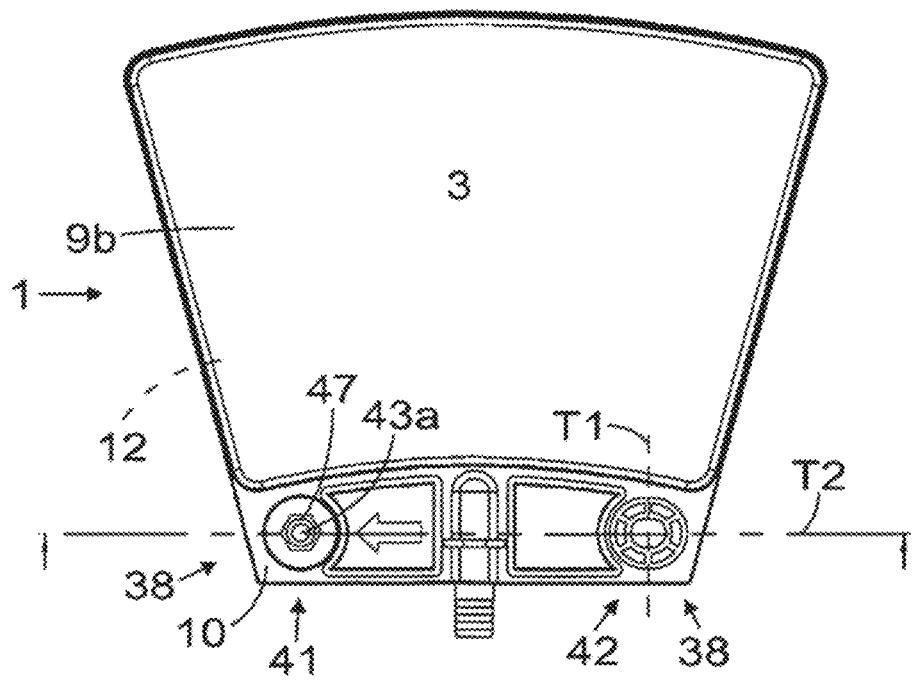
FIG. 5a is a schematic side view of a disc filter element.
Figure 5B:
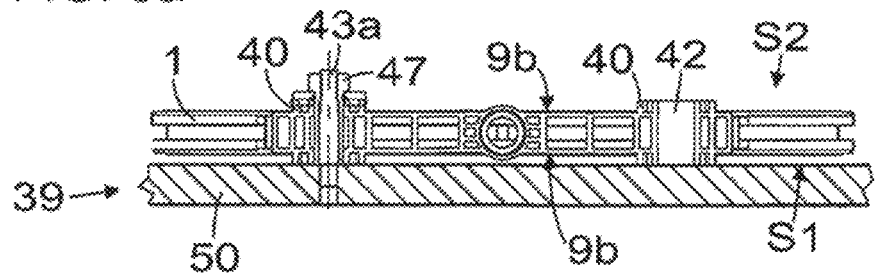
FIG. 5b is a cutaway view of a filter arrangement.
Figure 5C:
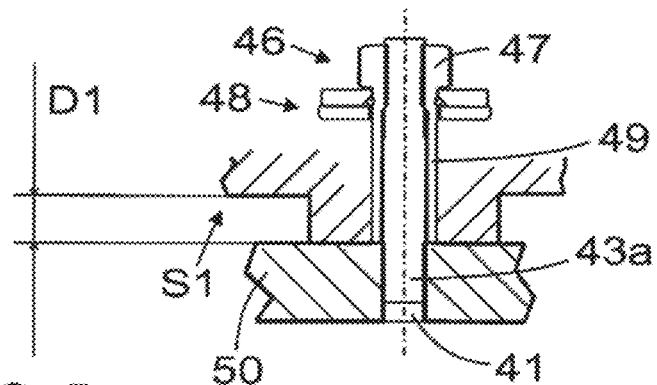
FIG. 5c is a cutaway view of a detail of the filter arrangement shown in FIG. 5b.

FIG. 5a is a schematic side view of a disc filter element, FIG. 5b is a cutaway view of a filter arrangement, and FIG. 5c is a cutaway view of a detail of the filter arrangement shown in FIG. 5b.

The purpose of the arrangement is to attach the filter element 1 described earlier in this description to a mounting means 39 in a frame of a disc filter apparatus.

The arrangement may comprise fastening elements 43a, 43b and fastening nuts 47. The material of the fastening elements 43a, 43b and fastening nuts 47 may be e.g. any suitable metal or alloy.

The fastening element 43a, 43b comprises a thread part 46, and the fastening nut 47 comprises a nut thread 48 matching to the thread part 48 of the fastening element 43a, 43b.

According to an embodiment, the fastening nut 47 further comprises a nut sleeve 49 that sets between the fastening opening 38 and the fastening element 43a, 43b. The length of said nut sleeve 49 is accurately selected such that it abuts to the fastening interface 50 of the mounting means 39 when the fastening nut 47 is in its predetermined tightening torque. An advantage is that together with accurate length fastening opening 38, the correct tightening torque can be found without using special tools, e.g. a torque wrench.

According to an embodiment, the nut sleeve 49 is a component of its own, separate from the fastening nut 47.

According to an embodiment of the disc filter element 1, it comprises a connector 8 for placing the internal cavity 12 in a fluid communication with a drainage line 13 of the disc filter apparatus 10. The connector 8 may comprise an aperture 11 (shown in FIG. 1) arranged to extend inwards from an orifice 14 arranged on an outer surface of the filter element and which aperture ends inside the filter element 1. The aperture 11 is in fluid contact with said internal cavity 12 of the filter element.

The aperture 11 is able to receive detachably a sleeve 18 (shown in FIG. 2) connected to said drainage line 13 of the disc filter apparatus. Furthermore, there may be a sealing arrangement arranged between the aperture 11 and the sleeve 18 and at a distance from said orifice 14.

According to an embodiment, the sealing arrangement is attached to the aperture 11, i.e. to the filter element 1. An advantage is that the sealing arrangement is automatically renewed together with renewing the filter element 1.

According to another embodiment, the sealing arrangement is attached to the sleeve 18. An advantage is that the condition of the sealing arrangement is easy to check by taking the sleeve 16 out From the aperture 11.

According to an embodiment, the sealing arrangement comprises at least one O-ring that is a cheap and reliable type of seal.

There are several advantages in the connector 8 described above. Firstly, the contact surfaces to be sealed are limited because there is only one orifice 14 In the filter element 1. Secondly, in case the sealing arrangement 17 fails, leakage or flush of acid out torn the filter element would direct mainly to direction of the aperture 11, i.e. in direction towards the inner parts of the filter apparatus, not outwards, i.e. in direction where operators of the filter apparatus are usually working.

According to an embodiment, the orifice 14 is arranged on one of the peripheral edge surfaces 18a, 18b, 18c. In the embodiment shown in FIGS. 1 and 2, the orifice 14 is arranged on the inner edge surface 18b and between fastening openings 38 arranged for attaching the filter element 1 to the disc filter apparatus. An advantage, is that if the sealing arrangement 17 fails, the mounting means 39 (and the hubs

40, if any) arranged in the fastening openings 38 will limit the zone affected by the leakage/flush. Thus the user safety of the filter apparatus can be increased.

As described earlier, the filter element 1 comprises a pair of side edge surfaces 18*a* which radiate respectively from the inner edge surface 18*b* to the outer edge surface 16*c*. According to an embodiment, the aperture 11 is directed towards the crossing point of imaginary extensions of said side edge surfaces 18*a*. When this kind of filter element 1 is in its place in the disc filter apparatus, the aperture is directed towards the central shaft of the apparatus. An advantage is that if the sealing arrangement 23 fails, the resulting leakage or flush of washing acid is directed towards inner parts axle of the apparatus.

The aperture 11 shown in the Figures has a round profile. However, the aperture may have some alternative profile, e.g. oval, polygon, such as rectangular, etc. Said alternative profiles may have an advantage that the cross-sectional area of the aperture 11 can be enlarged without growing the thickness of the frame member 4.

According to an embodiment, the cross-sectional area of the aperture 11 is 1 cm$^2$-10 cm$^2$ depending e.g. of the size of the filter element 1. FIG. 6*a* is a schematic perspective top side view of a disc filter element, and FIG. 6*b* is a cutaway view of a detail of the filter arrangement shown in FIG. 8*a*.

According to an embodiment, the aperture 11 is connected to the internal cavity 12 by a distributing channel 51 that joins to the internal cavity 12 at least essentially as broad as said internal cavity 12 and that gradually converges to the aperture 11. The distributing channel 51 is essentially free from any flow obstacles. An advantage of the distributing channel 51 is very low flow resistance.

According to an embodiment, the distributing channel 51 is created as an integral part of the frame member 4. In the embodiment shown in FIG. 8*a*, the distributing channel 51 is arranged in the connecting member end 10 of the filter element.

According to an embodiment, the aperture 11 comprises a first locking shape 27 whereas the sleeve 16 comprises a second locking shape 28. The locking shapes 27,28 are arranged to lock the sleeve 18 detachable within the aperture 11. Thus there is definite means for attaching the aperture 11 into drainage line 13.

According to an embodiment, the first locking shape 27 and the second locking shape 28 are arranged to receive a locking member locking the locking shapes 27, 28 to each other. The locking member may be e.g. a spline 29 as shown in FIG. 2. An advantage is that the locking is simple to use and the correctness of the attachment is easy to verify.

According to an embodiment, the connector 8 or the filter element 1 comprises a quick-release arrangement 30, such as shown in FIG. 6*a*. The quick-release arrangement 30 is arranged to release the first locking shape 27 from the second locking shape 28. An advantage is that the locking is easy and simple to do without using any tools.

Figure 7:
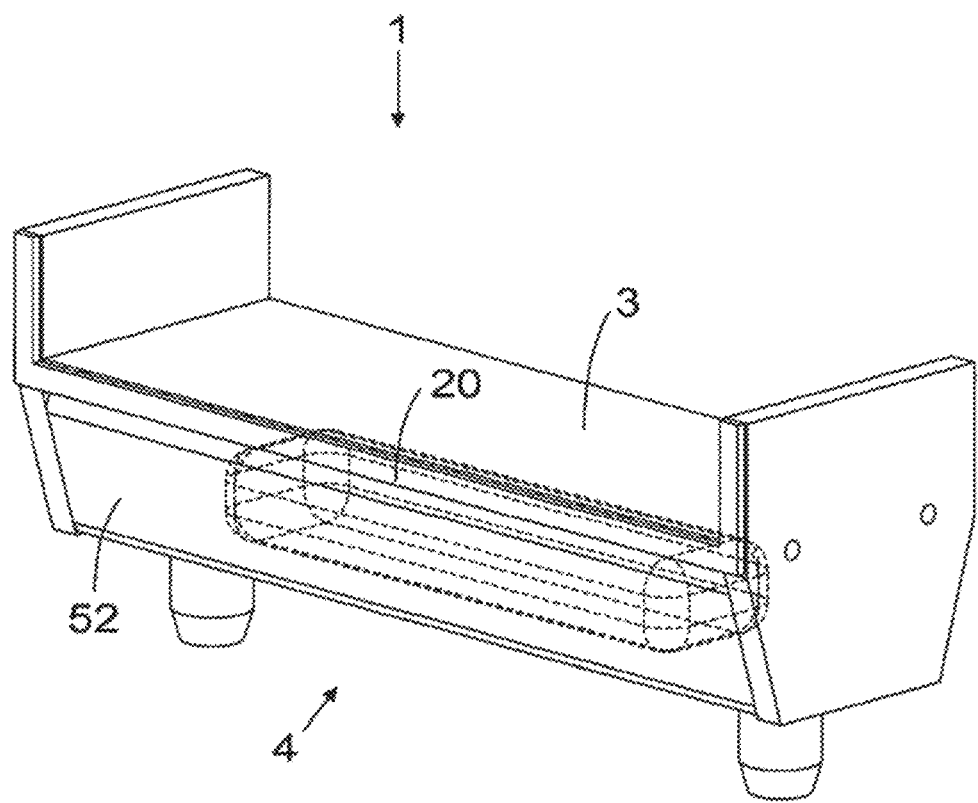
FIG. 7 is a perspective top view illustrating a belt filter element.

FIG. 7 is a perspective top view illustrating a belt filter element. According to an embodiment, the filter element 1 is a filter element of a belt filter apparatus. The filter element 1 comprises a vacuum box 52 that comprises a bottom, two opposite long sides, two opposite end walls, and a filter member 3.

The vacuums box 52 comprises an internal cavity 12 into which vacuum or underpressure is applied. When the filter element 1 is submerged in the slurry basin, the cake forms onto the filter member of the filter element 1 by influence of the underpressure in the internal cavity 12.

Figure 8:
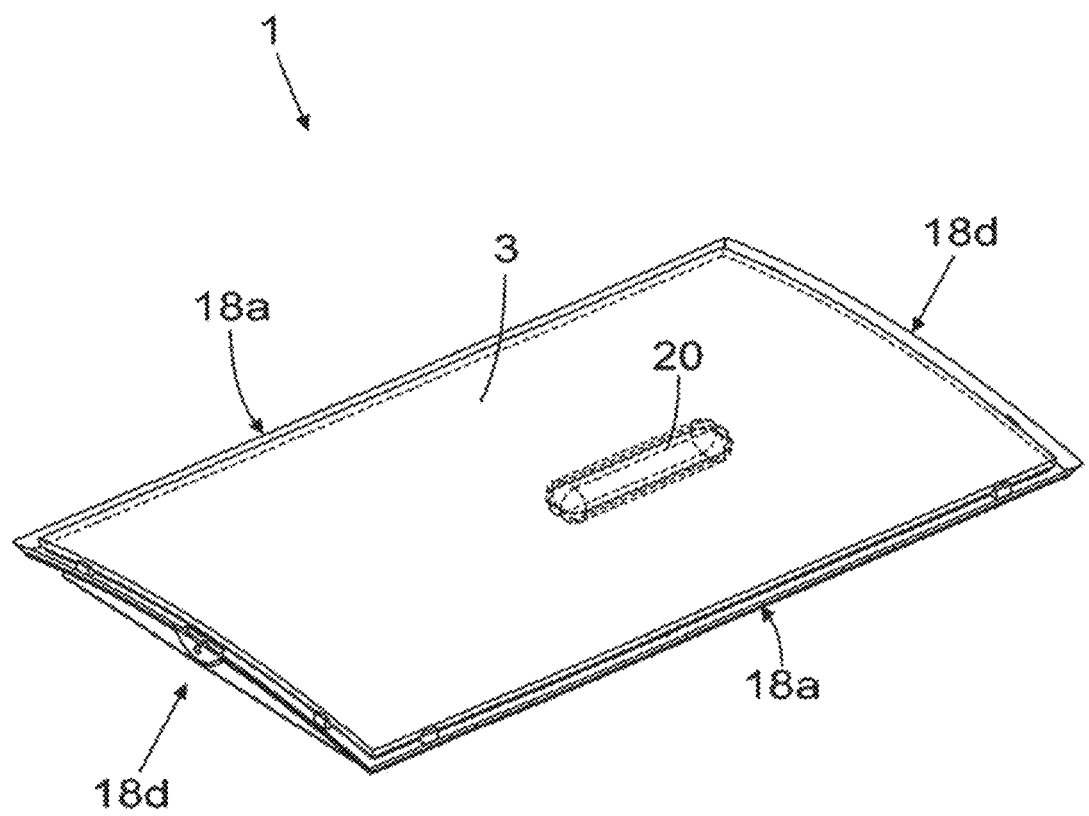
FIG. 8 is a perspective top view illustrating a drum filter element.

FIG. 8 is a perspective top view illustrating a drum filter element. According to an embodiment, the filter element 1 is a filter element of a drum filter apparatus that comprises a pair of side edge surfaces 18*a* arranged parallel with each other. The filter member 3 is arranged only on one side of the filter element 1. The the filter element 1 further comprises a pair of curved end surfaces 18*d*, wherein the curvature of the curved end surfaces 18*d* and the curvature of the filter member 3 coincide with the circumference of the outer surface of a drum filter of the drum filter apparatus.

Figure 9:
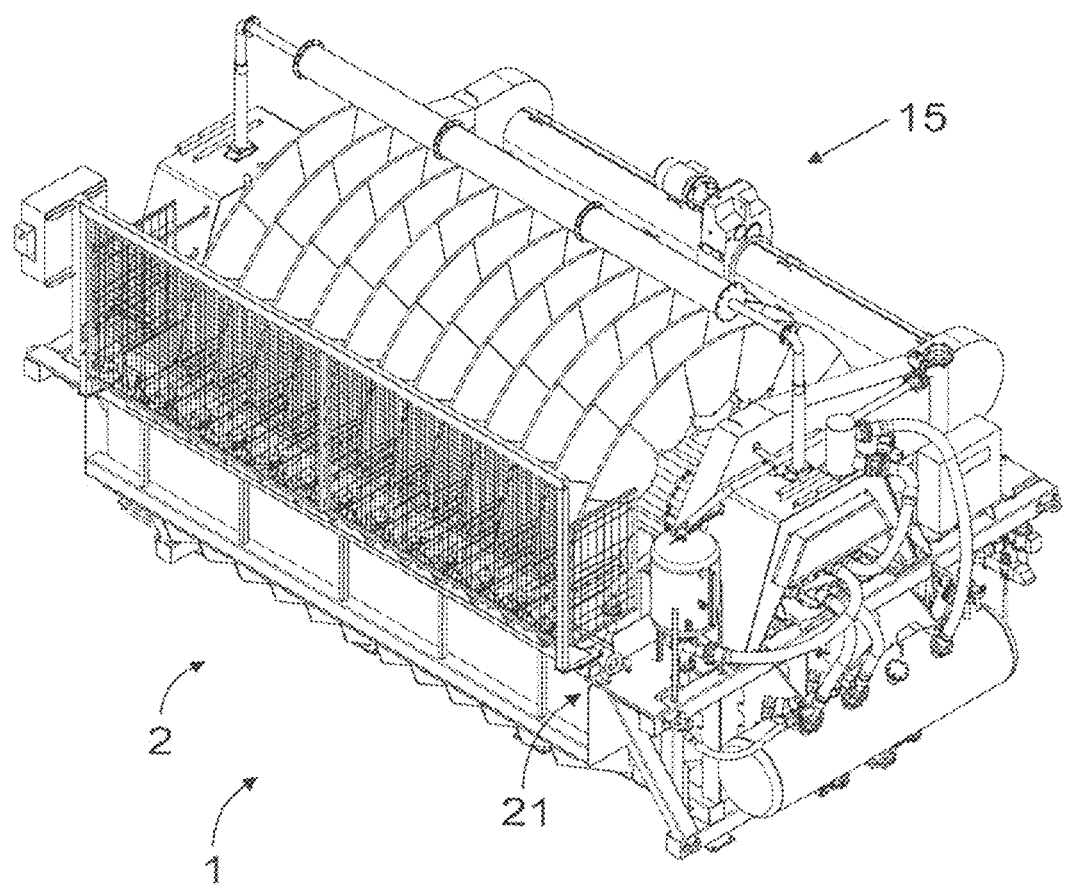
FIG. 9 is a perspective top view illustrating a disc filter apparatus.
Figure 10:
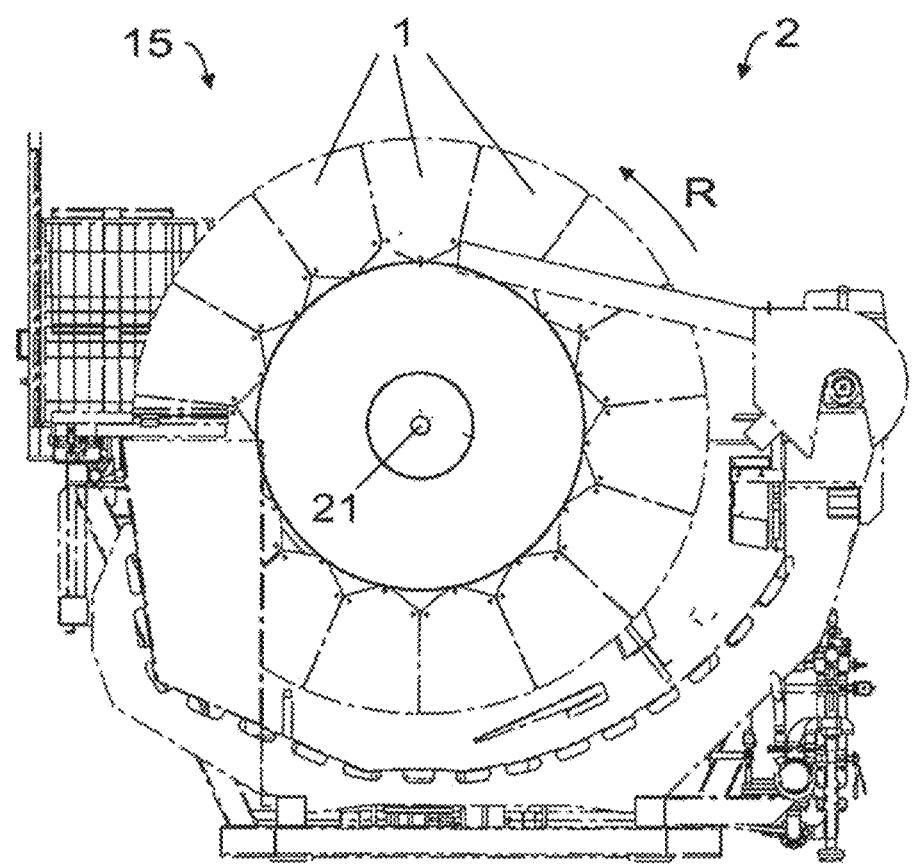
FIG. 10 is a side view illustrating the disc filter apparatus shown in FIG. 9.

FIG. 9 is a perspective top view illustrating a disc filter apparatus, and FIG. 10 is a side view illustrating the disc filter apparatus shown in FIG. 9.

The disc filter apparatus comprises a filter 15 consisting of several consecutive co-axial filter discs arranged in line co-axially around the central shaft 21 of the filter 15.

The filter 15 is supported by bearings on a frame of the filter apparatus and is rotatable about the longitudinal axis of the central shaft 21 such that the lower portion of the filter 15 is submerged in a slurry basin located below the filter 15. The filter is rotated by e.g. an electric motor.

The number of the filter discs may range from 2 to 20, for example. The filter apparatus shown in FIG. 9 comprises twelve (12) filter discs. The outer diameter of the filter 15 may be ranging from 1.5 m to 4 m, for example. Examples of commercially available disc filters include Ceramec CC filters, models CC-6, CC-15, CC-30, CC-45, CC-60, CC-96 and CC-144 manufactured by Outotec Inc.

All the filter discs can be preferably essentially similar in structure. Each filter disc may be formed of a number of individual sector-shaped filter elements 1 discussed earlier in this description. The filter elements 1 are mounted circumferentially in a radial planar plane around the central shaft 21 to form an essentially continuous and planar disc surface. The number of the filter plates in one filter disc may be 12 or 15, for example.

As the central shaft 21 is fitted so as to revolve, each filter element 1 is, in its turn, displaced into a slurry basin and further, as the central shaft 21 revolves, rises out of the basin. As the filter member 3 is submerged in the slurry basin, the cake forms onto the filter member 3 under the influence of the vacuum. Once the filter element 1 comes out of the basin, pores of the filter member 3 are emptied as the cake is deliquored for a predetermined time which is essentially limited by the rotation speed of the disc. The cake can be discharged by e.g. scraping, after which the cycle begins again.

Operation of the disc filter apparatus may be controlled by a filter control unit, such as a Programmable Logic Controller, PLC.

Figure 11:
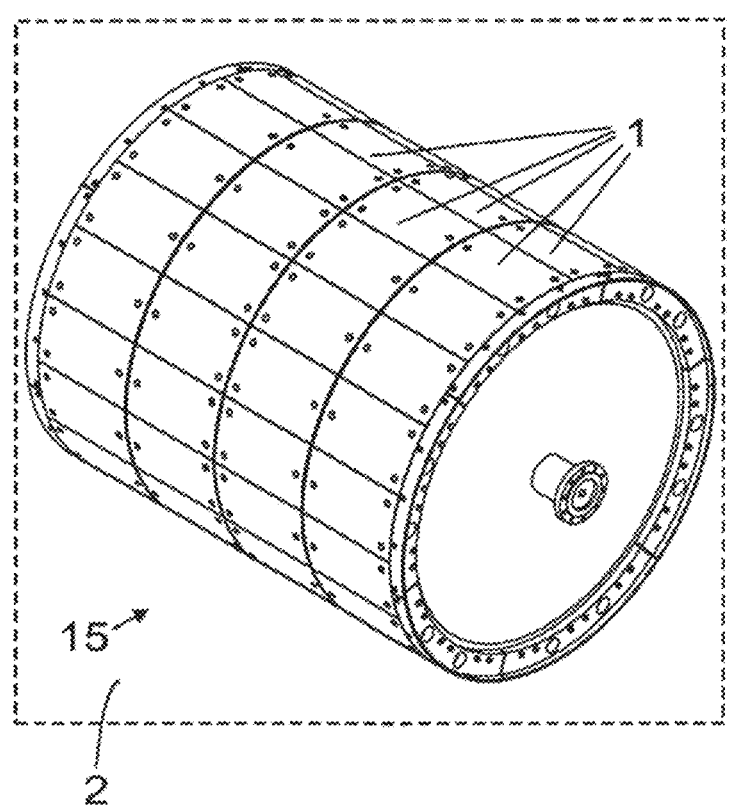
FIG. 11 illustrates a drum filter apparatus.

FIG. 11 is a perspective top view illustrating another filter apparatus 2. The filter apparatus 2 shown here is a drum filter apparatus comprising a drum-like filter 15. It is to be noted that the filter apparatus 2 is shown by dash lines in Figure X in order to clarify the structure of the filter 15.

In the drum filter apparatus the filter element 1 is a part of outer surface of the filter 15. The features of the filter element 1 are described earlier in this description.

The diameter of the filter 15 may be e.g. in range of 1.8 m-4.8 m and length in axial direction 1 m-10 m. The surface area of the filter 15 may be e.g. in range of 2-200 m$^2$.

Examples of commercially available drum filters include CDF-6/1.8 manufactured by Outotec Inc.

Function of drum filter apparatus has already described in background part of this description.

Figure 12:
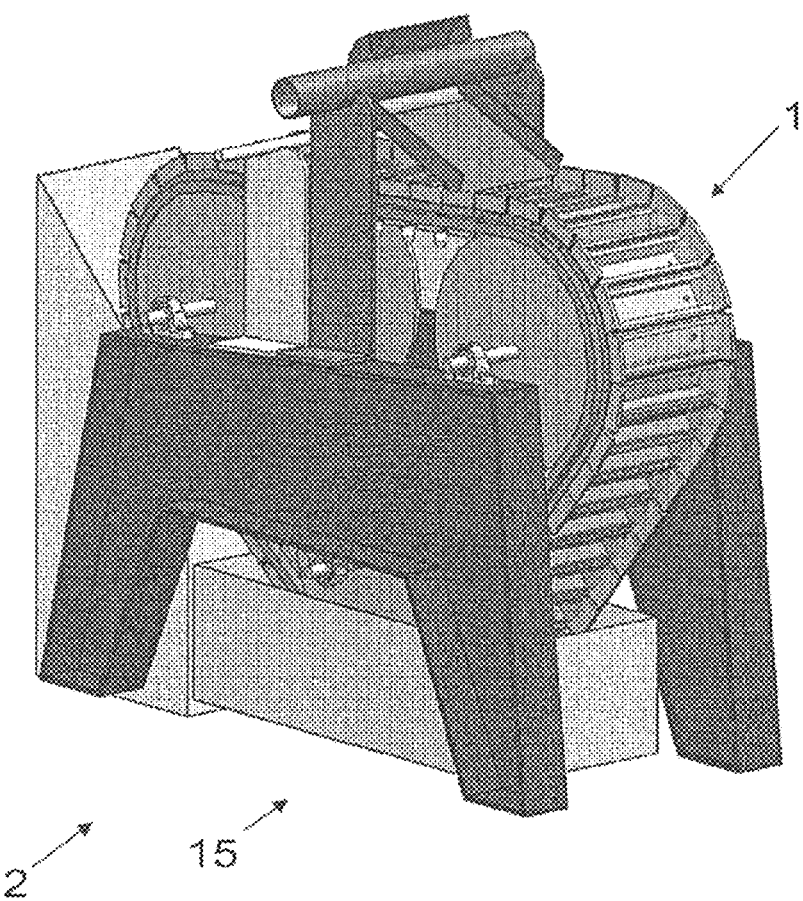
FIG. 12 is a perspective view of a belt filter apparatus.

FIG. 12 illustrates in a side view, still another filter apparatus 2. The filter apparatus 2 here is a vacuum belt filter apparatus.

The filter 15 of the vacuum belt filter apparatus comprises an endless belt comprising a multitude of Individual filter elements 1 arranged one after another in the longitudinal direction of the belt. The features of the filter element 1 are described earlier in this description. The filter elements 1 follow one after another along the whole length of the belt but for sake of simplicity, all vacuum boxes have not been illustrated.

The filter element 1 comprises a vacuum box into which vacuum or underpressure is applied. When the filter element 1 is submerged in the slurry basin, the cake forms onto the filter member of the filler element 1 by influence of the underpressure in the vacuum box.

The cake can be discharged by e.g. scraping, after which the cycle begins again.

The capillary filter member 3, when wetted, does not allow air to pass through which decreases the necessary vacuum level, enables the use of smaller vacuum pumps and, consequently, yields significant energy savings.

According to aspect 1, a filter element for a filter apparatus comprises
at least one filter member comprising a permeable membrane layer and having a first filter surface for receiving a pressure and directed towards an internal cavity arranged inside the filter element, and a second filter surface for receiving solid particles filtered from a feed, wherein the filter member forms a capillary filter, and
a frame member arranged to support the at least one filter member in such a manner that the internal cavity is formed, wherein the frame member comprises a non-porous material.

According to aspect 2, in the filter element according to aspect 1, the frame member comprises at least one support part for supporting the filter member.

According to aspect 3, in the filter element according to aspect 2, the frame member comprises a plurality of support parts.

According to aspect 4, in the filter element according to aspect 3, the frame member comprises a plurality of support parts spaced from other support parts and the structure of the frame member is formed to prevent transfer of forces between the support parts.

According to aspect 5, in the filter element according to aspect 3 or 4, the sum of the cross-sectional areas of a filter member end of the support parts is in the range of 5 percent to 60 percent of the sum of the areas of the first filter surfaces of the filter members arranged on the same side of the internal cavity and at said filter member end of said support parts.

According to aspect 6, in the filter element according to any one of aspects 3 to 5, filter element 1 is formed to endure a 0.5 bar pressure inside the internal cavity 12 during cleaning and/or maintenance.

According to aspect 7, in the filter element according to any one of aspects 2 to 6, each support part is connected to at least one other support part by a connector comprising a non-linear shape.

According to aspect 8, in the filter element according to any one of aspects 2 to 6, the support parts are not connected to one another, but are only in contact with the filter members.

According to aspect 9, in the filter element according to any one of aspects 3 to 8, the number of support parts on a square meter of first filter surface is in the range of 50 to 4000 support parts.

According to aspect 10, in the filter element according to aspect 9, the support parts comprise a round cross-section and the number of support parts on a square meter of first filter surface is in the range of 1000 to 4000 support parts.

According to aspect 11, in the filter element according to aspect 9, the support parts comprise a round cross-section and the number of support parts on a square meter of first filter surface is in the range of 1500 to 2500 support parts.

According to aspect 12, in the filter element according to aspect 9, the support parts comprise an elongated cross-section and the number of support parts on a square meter of first filter surface is in the range of 50 to 400 support parts.

According to aspect 13, in the filter element according to aspect 9, the support parts comprise an elongated cross-section and the number of support parts on a square meter of first filter surface is in the range of 100 to 200 support parts.

According to aspect 14, in the filter element according to any one of aspects 3 to 13, at least one support part comprises an aperture extending through the support part between the filter member end of the support part and the end of the support part opposite to the filter member end in a direction substantially parallel to the direction of the first filter surface.

According to aspect 15, in the filter element according to any one of aspects 3 to 14, the frame member comprises an edge part comprising a peripheral edge surface that is arranged at an angle ( ) in relation to the first filter surface.

According to aspect 16, in the filter element according to any one of the preceding aspects 1 to 15, the frame member has a thermal expansion coefficient different from that of the filter member.

According to aspect 17, in the filter element according to any one of the preceding aspects 1 to 16, the filter member comprises a ceramic material or a composition comprising a ceramic material.

According to aspect 18, in the filter element according to aspect 17, the ceramic material comprises at least one of the following: alumina, aluminium silicates, silicon carbide and titania.

According to aspect 19, in the filter element according to any one of the preceding aspects 1 to 18, wherein the frame member comprises a polymer material or a composition comprising a polymer material.

According to aspect 20, in the filter element according to aspect 19, the polymer material comprises thermoplastic.

According to aspect 21, in the filter element according to aspect 20, the thermo-plastics comprise at least one of the following: polyamide (PA) polypropylene (PP), polysulphone (PSU), polyethersulphone (PES), polyphenylene oxide (PPO), polyphenylene sulphide (PPS), acrylo butadiene styrene (ABS), poly-butylene terephthalatate (PBT), HDPE, PC and other polyolefin.

According to aspect 22, in the filter element according to any one of aspects 19 to 21, at least the surface of the support parts comprises the polymer material or the composition comprising a polymer material.

According to aspect 23, in the filter element according to any one of aspects 2 to 22, the edge part of the frame member comprises a material that differs from the material of the support parts.

According to aspect 24, in the filter element according to any one of the aspects 2 to 22, the edge part of the frame member comprises the same material as the material of the support parts.

According to aspect 25, in the filter element according to any one of the preceding aspects 1 to 24, the at least one filter member is arranged fixedly to the frame member.

According to aspect 26, in the filter element according to aspect 25, the at least one filter member is glued or melted fixedly to the frame member.

According to aspect 27, in the filter element according to aspect 25 or 26, the at least one filter member is arranged fixedly to at least one support part of the frame member.

According to aspect 28, in the filter element according to any one of aspects 26 to 27, at least a part of at least one surface of the filter member is formed as a rough joining interface comprising a grit number is in the range of 40 to 180.

According to aspect 29, in the filter element according to aspect 28, at least a part of the surface of the filter member formed as a rough joining interface is in contact with the frame member.

According to aspect 30, in the filter element according to any one of the preceding aspects 1 to 29, at least a part of at least one surface of the filter member comprises a grit number greater than or equal to 600.

According to aspect 31, in the filter element according to any one of the preceding aspects 1 to 30, the filter element comprises at least one filter member arranged on each side of the frame member providing two first filter surfaces, one on each side of the frame member.

According to aspect 32, in the filter element according to aspect 31, each end of a support part is arranged fixedly to one of said filter members, such that the support part is arranged fixedly between two filter members.

According to aspect 33, in the filter element according to any one of the preceding aspects 1 to 32, the filter element is a truncated-sector-shaped filter element for a disc filter apparatus and comprises filter surfaces on both sides of the element.

According to aspect 34, in the filter element according to any one of the aspects 1 to 30,
the filter element is a filter element of a drum filter apparatus, and
the filter element comprises a pair of side edge surfaces arranged parallel with each other, and comprising second filter surface(s) only on one side of the filter element, and a pair of curved end surfaces, wherein the curvature of the curved end surfaces and the curvature of the second filter surface(s) of said filter element coincide with the circumference of the outer surface of a drum filter of the drum filter apparatus.

According to aspect 35, in the filter element according to any one of the aspects 1 to 30, the filter element is a filter element of a belt filter apparatus.

According to aspect 36, in the filter element according to any one of the preceding aspects 1 to 35, the total area of second filtering surface(s) of one filter element is greater than or equal to 0.2 square meters.

According to aspect 37, in the filter element according to any one of the preceding aspects 1 to 36,
the at least one frame member comprises between a connecting member end of the frame member and the filter member a material that is more flexible than the material of the filter member, wherein the connecting member end of the frame member is the end at which the filter element is arrangeable to the filter apparatus.

According to aspect 38, in the filter element according to aspect 37, said more flexible material is reversibly flexible.

According to aspect 39, in the filter element according to aspect 37 or 38, the frame member comprises at least between the connecting member end of the frame member and the filter member a plastic portion comprising a plastic material.

According to aspect 40, in the filter element according to aspect 39, the plastic portion comprises identification information for filter element identification purposes.

According to aspect 41, in the filter element according to any one of aspects 1 to 33 or according to any one of aspects 36 to 40, the at least one frame member forms at least the outer edge surface of the filter element, wherein the outer edge surface of the filter element is located at the opposite end of the filter element compared to the connecting member end of the filter element at which the filter element is arrangeable to the filter apparatus, and wherein at least the outer edge surface of the frame member comprises a non-porous and acid-resistant material.

According to aspect 42, in the filter element according to any one aspects 1 to 32 or according to any one of aspects 36 to 41, the connecting member end comprises at least two holes for arranging the filter element to the filter apparatus.

According to aspect 43, in the filter element according to aspect 42, said openings extend through the material.

According to aspect 44, in the filter element according to aspect 33 or according to any one of aspects 36 to 43, the connecting member end comprises the narrower end of the truncated-sector-shaped filter element.

According to aspect 45, in the filter element according to any one of aspects 41 to 44, the non-porous and acid-resistant material of the frame member is additionally tough.

According to aspect 46, in the filter element according to any one of aspects 41 to 45, the non-porous and acid-resistant material of the frame member is additionally durable.

According to aspect 47, in the filter element according to any one of aspects 41 to 46, the non-porous and acid-resistant material of the frame member is additionally resilient.

According to aspect 48, in the filter element according to any one of aspects 40 to 47, the non-porous and acid-resistant material of the frame member is additionally shock absorbing.

According to aspect 49, in the filter element according to any one of the aspects 41 to 47, the non-porous and acid-resistant material of the frame member is additionally less water-absorbent than the material of the filter member.

According to aspect 50, in the filter element according to aspects 41 to 49, the at least one frame member additionally covers the connecting member end of the filter element.

According to aspect 51, in the filter element according to any one of aspects 41 to 50, the at least one frame member additionally at least partly covers both side edges of the filter element, wherein the side edges are located at the each side of the filter element arrangeable to face towards the adjacent filter element.

According to aspect 52, in the filter element according to any one of the preceding aspects 1 to 51, the bubble point of the filter member is at least 0.2 bar.

According to aspect 53, a filter apparatus comprises at least one filter element according to any one of aspects 1 to 52, and the filter apparatus comprises at least one of the following: a disc filter apparatus, a drum filter apparatus and a belt filter apparatus.

According to aspect 54, a method for assembling a filter element for a filter apparatus comprises the following steps:

providing at least one filter member comprising permeable membrane layer and having a first filter surface for receiving a pressure directed towards an internal cavity arranged inside the filter element and a second filter surface for receiving solid particles filtered from a feed, providing a frame member comprising an edge part comprising a peripheral edge surface, wherein the frame member comprises a non-porous material, and mounting the filter member to the frame member in such a manner that the peripheral edge surface is arranged at an angle in relation to the first filter surface.

According to aspect 55, in the method according to aspect 54, the frame member comprises support parts that are arranged to support the filter member when the filter member is mounted to the frame member.

According to aspect 56, in the method according to aspect 54 or 55, the support parts are spaced from one another, such that the support parts do not transfer forces to one another.

According to aspect 57, in the method according to any one of aspects 54 to 56, the method further comprises forming at least a part of at least one surface of the filter member as a rough joining interface, and wherein the filter member is mounted to the frame member in such a manner that at least a part of the surface of the filter member formed as a rough joining interface is in contact with the frame member.

According to aspect 58, in the method according to aspect 57, the rough joining interface comprises a grid number of 150 or lower.

According to aspect 59, the filter element according to any one of aspects 1-51 further comprises a peripheral edge surface, and at least part of the peripheral edge surface comprises at least one groove or at least one ridge arranged along the at least part of the peripheral edge surface.

According to aspect 60, in the filter element according to aspect 59, the peripheral edge surface comprises not more than one groove.

According to aspect 61, in the filter element according to any of aspects 59-60, the filter element is a truncated sector-shaped filter element of a disc filter apparatus, and the at least part of the peripheral edge surface comprises the side edge surfaces of the filter element.

According to aspect 62, in the filter element according to aspect 61, the at least part of the peripheral edge surface further comprises the outer edge surface of the filter element.

According to aspect 63, in the filter element according to any of aspects 59-60, the filter element is a filter element of a drum filter apparatus, the filter element comprising a pair of side edge surfaces arranged parallel with each other, and comprising second filter surface(s) only on one side of the filter element, and a pair of curved end surfaces, wherein the curvature of the curved end surfaces and the curvature of the second filter surface(s) of said filter element coincide with the circumference of the outer surface of a drum filter of the drum filter apparatus, wherein the at least part of the peripheral edge surface comprises at least one of the side edge surfaces and/or the curved end surfaces.

According to aspect 64, in the filter element according to any of aspects 59-60, the filter element is a filter element of a belt filter apparatus, the filter element comprising a pair of side edge surfaces arranged parallel with each other, and a pair of end surfaces, wherein the at least part of the peripheral edge surface comprises at least one of the side edge surfaces and/or end surfaces.

According to aspect 65, the filter element according to any of aspects 59-60 comprises a seal member attached in the at least one groove or at least one ridge.

According to aspect 66, in the filter element according to any of aspects 1-52 or 59-65 comprises a connecting member arranged in a connecting member end of the frame member, the connecting member comprising fastening openings for attaching the filter element to mounting means in a frame of the disc filter apparatus, wherein the fastening openings are formed by the material of the connecting member end.

According to aspect 67, in the filter element according to aspect 66, the length of the fastening opening is greater than the distance between the second filter surfaces.

According to aspect 68, in the filter element according to aspect 66 or 67, all the fastening openings are equal in length.

According to aspect 69, in the filter element according to any one of aspects 66-68, the first end of each of the fastening openings arranged on the first side of the filter element are arranged outer and at a first distance from plane of the second filter surface arranged on said first side of the filter element, the first distance being equal in each of the fastening openings.

According to aspect 70, in the filter element according to aspect 69, the first distance is in range of 1 mm-20 mm, preferably 4 mm-12 mm, more preferably 6 mm-10 mm.

According to aspect 71, in the filter element according to any one of aspects 67-69, the fastening opening is arranged in a hub that is thicker than other parts of the filter element.

According to aspect 72, an arrangement for attaching the filter element according to any one of the aspects 1-52 or 59-71 to a mounting means arranged in a frame of the disc filter apparatus comprises fastening elements being arrangeable in the fastening openings in direct coupling with the material of the connecting member end.

According to aspect 73, a filter element of a disc filter apparatus comprises a connecting member arranged in a connecting member end of the filter element, the connecting member comprising fastening openings for attaching the filter element to mounting means in a frame of the disc filter apparatus, wherein the fastening openings comprises a fitted hole dimensioned for an accurate tolerance with a first fastening element attaching the fitted hole to said mounting means, and an elongated hole dimensioned for an accurate tolerance in a first direction but for an loose tolerance in a second direction with a second fastening element attaching the elongated hole to said mounting means, wherein the first direction is orthogonal to the second direction and the second direction is directed towards the fitted hole.

According to aspect 74, in the filter element according to aspect 73, the fitted hole has a round shape.

According to aspect 75, in the filter element according to aspects 73 or 74, the elongated hole has a shape of rectangular with rounded ends.

According to aspect 76, in the filter element according to any one of aspects 73-75, the first direction of the elongated hole has equal diameter with the smallest diameter of the fitted hole.

According to aspect 77, in the filter element according to any one of aspects 73-76, the dimension of the elongated hole in the second direction is larger by 1.01 to 1.20 times the distance between the fitted hole and the elongated hole compared to the dimension of said elongated hole in the first direction.

According to aspect 78, in the filter element according to any one of aspects 73-77, the dimension of the fitted hole is 12 mm to 30 mm.

According to aspect 79, the filter element according to any one of the aspects 1-52 or 59-78 comprises a connector for placing the internal cavity in a fluid communication with a drainage line of the disc filter apparatus, the connector comprising an aperture arranged to extend inwards from an orifice arranged on an outer surface of the filter element and to end inside the filter element, the aperture being in fluid contact with said internal cavity of the filter element, the aperture being arranged to receive detachably a sleeve connected to said drainage line of the disc filter apparatus so that a sealing arrangement is arranged between the aperture and the sleeve and at a distance from said orifice.

According to aspect 80, in the filter element according to aspect 79, the edge part comprises an peripheral edge surfaces, and the aperture being arranged on one of the peripheral edge surfaces.

According to aspect 81, in the filter element according to aspect 80, the aperture is arranged on an inner edge surface between fastening means arranged for attaching the filter element to the disc filter apparatus.

According to aspect 82, in the filter element according to aspect 80 or 81, the filter element comprises a pair of side edge surfaces which radiate respectively from the inner edge surface to an outer edge surface, and the aperture being directed towards the crossing point of imaginary extensions of the side edge surfaces.

According to aspect 83, in an arrangement for attaching the filter element according to any of the aspects 79-82 to the drainage line of the filter apparatus, the aperture comprises a first locking shape and the sleeve comprises a second locking shape, said locking shapes being arranged to lock the sleeve detachable within the aperture.

According to aspect 84, in the arrangement according to aspect 83, the first locking shape and the second locking shape are arranged to receive a locking member locking the locking shapes to each other.

According to aspect 85, in the arrangement according to aspect 84, the locking member is a spline.

According to aspect 86, in the arrangement according to any one of the aspects 83-85, the connector comprises a quick-release arrangement arranged to release the first locking shape from the second locking shape.

It will be obvious to a person skilled in the art that, as the technology advances, the inventive concept can be implemented in various ways. The invention and its embodiments are not limited to the examples described above but may vary within the scope of the claims.

The invention claimed is:

1. A filter element for a filter apparatus, the filter element comprising:

at least one filter member including a permeable membrane layer having a first inner filter surface for receiving a pressure and directed towards an internal cavity arranged inside the filter element, and an outer filter surface for receiving solid particles filtered from a feed that flows into the internal cavity via the outer filter surface and then the first inner filter surface whereby the feed exits the internal cavity from an outlet in fluid communication with the internal cavity, wherein the filter member forms a capillary filter; and a frame member arranged to support the at last one filter member in such a manner that the internal cavity is formed, wherein the frame member is made of or formed of a non-porous material, wherein the at least one filter member is arranged on each side of the frame member providing the first inner filter surface and a second inner filter surface, one on each side of the frame member, and wherein the frame member comprises a polymer material or a composition comprising a polymer material.

2. The filter element according to claim 1, wherein the frame member comprises at least one support part for supporting the filter member.

3. The filter element according to claim 2, wherein the frame member comprises a plurality of support parts spaced from other support parts and wherein the structure of the frame member is formed to prevent transfer of forces between the support parts.

4. The filter element according to claim 3, wherein at least one support part comprises an aperture extending through the support part between the filter member end of the support part and the end of the support part opposite to the filter member end in a direction substantially parallel to the direction of the first inner filter surface.

5. The filter element according to claim 2, wherein each support part is connected to at least one other support part by a connector comprising a non-linear shape.

6. The filter element according to claim 2, wherein the support parts are not connected to one another, but are only in contact with the filter members.

7. The filter element according to claim 2, wherein at least a surface of the support parts comprises the polymer material or the composition comprising a polymer material.

8. The filter element according to claim 7, wherein an edge part of the frame member comprises a material that differs from the material of the support parts.

9. The filter element according to claim 2, wherein the at least one support part defines a channel extending transversely therethrough configured to enable a better flow of the feed within the internal cavity, and the frame member has an outer peripheral surface defining a groove therein in which a seal member is received.

10. The filter element according to claim 1, wherein the filter member comprises a ceramic material or a composition comprising a ceramic material.

11. The filter element according to claim 1, wherein the polymer material comprises thermoplastic comprising at least one of the following: polyamide (PA) polypropylene (PP), polysulphone (PSU), polyethersulphone (PES), polyphenylene oxide (PPO), polyphenylene sulphide (PPS), acrylo butadiene styrene (ABS), polybutylene terephthalatate (PBT), HDPE, PC and other polyolefin.

12. The filter element according to claim 1, wherein each end of a support part is arranged fixedly to one of the filter members, such that the support part is arranged fixedly between two filter members.

13. The filter element according to claim 1, wherein the filter element is a truncated-sector-shaped filter element for a disc filter apparatus and comprising filter surfaces on both sides of the element.

14. The filter element according to claim 1, wherein the filter element is a filter element of a drum filter apparatus, the filter element comprising:
a pair of side edge surfaces arranged parallel with each other, and comprising one outer filter surface only on one side of the filter element; and
a pair of curved end surfaces, wherein the curvature of the curved end surfaces and the curvature of the outer filter surface of the filter element coincide with the circumference of the outer surface of a drum filter of the drum filter apparatus.

15. The filter element according to claim 1, wherein the at least one frame member comprises between a connecting member end of the frame member and the filter member a material that is more flexible than the material of the filter member, wherein the connecting member end of the fame member is the end at which the filter element is arrangeable to the filter apparatus.

16. The filter element according to claim 1, wherein the at least one frame member forms at least an outer edge surface of the filter element, wherein the outer edge surface of the filter element is located at the opposite end of the filter element compared to a connecting member end of the filter element at which the filter element is arrangeable to the filter apparatus, and wherein at least the outer edge surface of the frame member comprises a non-porous and acid-resistant material.

17. The filter element according to claim 16, wherein the non-porous and acid-resistant material of the frame member is additionally less water-absorbent than the material of the filter member.

18. The filter element according to claim 1, wherein the bubble point of the filter member is at least 0.2 bar.

* * * * *